US010712695B2

(12) United States Patent
Inoue et al.

(10) Patent No.: US 10,712,695 B2
(45) Date of Patent: Jul. 14, 2020

(54) IMAGE FORMING APPARATUS CONFIGURED TO CONTROL A LIGHTING DUTY OF A HEAT GENERATOR

(71) Applicants: Daisuke Inoue, Tokyo (JP); Tomoya Adachi, Kanagawa (JP); Yuusuke Furuichi, Kanagawa (JP); Yukimichi Someya, Saitama (JP); Masahiro Samei, Kanagawa (JP); Takamasa Hase, Tokyo (JP)

(72) Inventors: Daisuke Inoue, Tokyo (JP); Tomoya Adachi, Kanagawa (JP); Yuusuke Furuichi, Kanagawa (JP); Yukimichi Someya, Saitama (JP); Masahiro Samei, Kanagawa (JP); Takamasa Hase, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/519,254

(22) Filed: Jul. 23, 2019

(65) Prior Publication Data
US 2020/0033775 A1 Jan. 30, 2020

(30) Foreign Application Priority Data

Jul. 30, 2018 (JP) ................... 2018-142677
Nov. 8, 2018 (JP) ................... 2018-210567

(51) Int. Cl.
*G03G 15/20* (2006.01)
*G05D 23/24* (2006.01)
*G03G 15/00* (2006.01)

(52) U.S. Cl.
CPC ..... *G03G 15/2053* (2013.01); *G03G 15/2017* (2013.01); *G03G 15/2039* (2013.01);
(Continued)

(58) Field of Classification Search
CPC .......... G03G 15/2017; G03G 15/2039; G03G 15/2053; G03G 15/5004; G03G 21/1685;
(Continued)

(56) References Cited

U.S. PATENT DOCUMENTS

2015/0212459 A1  7/2015  Hase et al.
2015/0220028 A1  8/2015  Samei et al.
(Continued)

FOREIGN PATENT DOCUMENTS

JP   2004-246045   9/2004
JP   2017-055625   3/2017
JP   2017-068107   4/2017

*Primary Examiner* — Sophia S Chen
(74) *Attorney, Agent, or Firm* — Harness, Dickey and Pierce, P.L.C.

(57) ABSTRACT

An image forming apparatus includes a heating device including a heat generator and a resistance value identifier, a body, a resistance value acquisition unit, a detector to detect detachment and attachment of the heating device from and to the body, and an electric power controller. The resistance value identifier corresponds to a resistance value of the heat generator. The resistance value acquisition unit acquires the resistance value from the resistance value identifier. The electric power controller causes the resistance value acquisition unit to acquire the resistance value when the detector detects detachment and attachment of the heating device. The electric power controller changes a lighting duty of the heat generator when the acquired resistance value of the heat generator is different from the resistance value before the detector detects detachment and attachment of the heating device.

8 Claims, 13 Drawing Sheets

(52) U.S. Cl.
CPC ......... *G03G 15/5004* (2013.01); *G05D 23/24* (2013.01); *G03G 2215/2035* (2013.01)

(58) Field of Classification Search
CPC ... G03G 2215/2035; G03G 2221/1639; G05D 23/24
See application file for complete search history.

(56) References Cited

U.S. PATENT DOCUMENTS

| | | |
|---|---|---|
| 2015/0220029 A1 | 8/2015 | Samei et al. |
| 2015/0234329 A1 | 8/2015 | Hase et al. |
| 2016/0054691 A1 | 2/2016 | Hase et al. |
| 2016/0147185 A1 | 5/2016 | Hase et al. |
| 2016/0274510 A1 | 9/2016 | Hase et al. |
| 2017/0003633 A1 | 1/2017 | Hase et al. |
| 2017/0255150 A1 | 9/2017 | Hase et al. |
| 2017/0285542 A1 | 10/2017 | Hase et al. |
| 2018/0067431 A1* | 3/2018 | Nanno |
| 2018/0253054 A1* | 9/2018 | Tanto ................. G03G 21/1685 |
| 2018/0356764 A1* | 12/2018 | Kamiya ............. G03G 21/1685 |
| 2019/0196374 A1* | 6/2019 | Adachi ............. G03G 15/2053 |
| 2019/0278206 A1* | 9/2019 | Adachi ............. G03G 15/5004 |
| 2019/0286029 A1* | 9/2019 | Adachi ............. G03G 15/5004 |
| 2020/0033766 A1* | 1/2020 | Hase ................. G03G 15/2039 |
| 2020/0033767 A1* | 1/2020 | Adachi ............. G03G 15/2039 |

\* cited by examiner

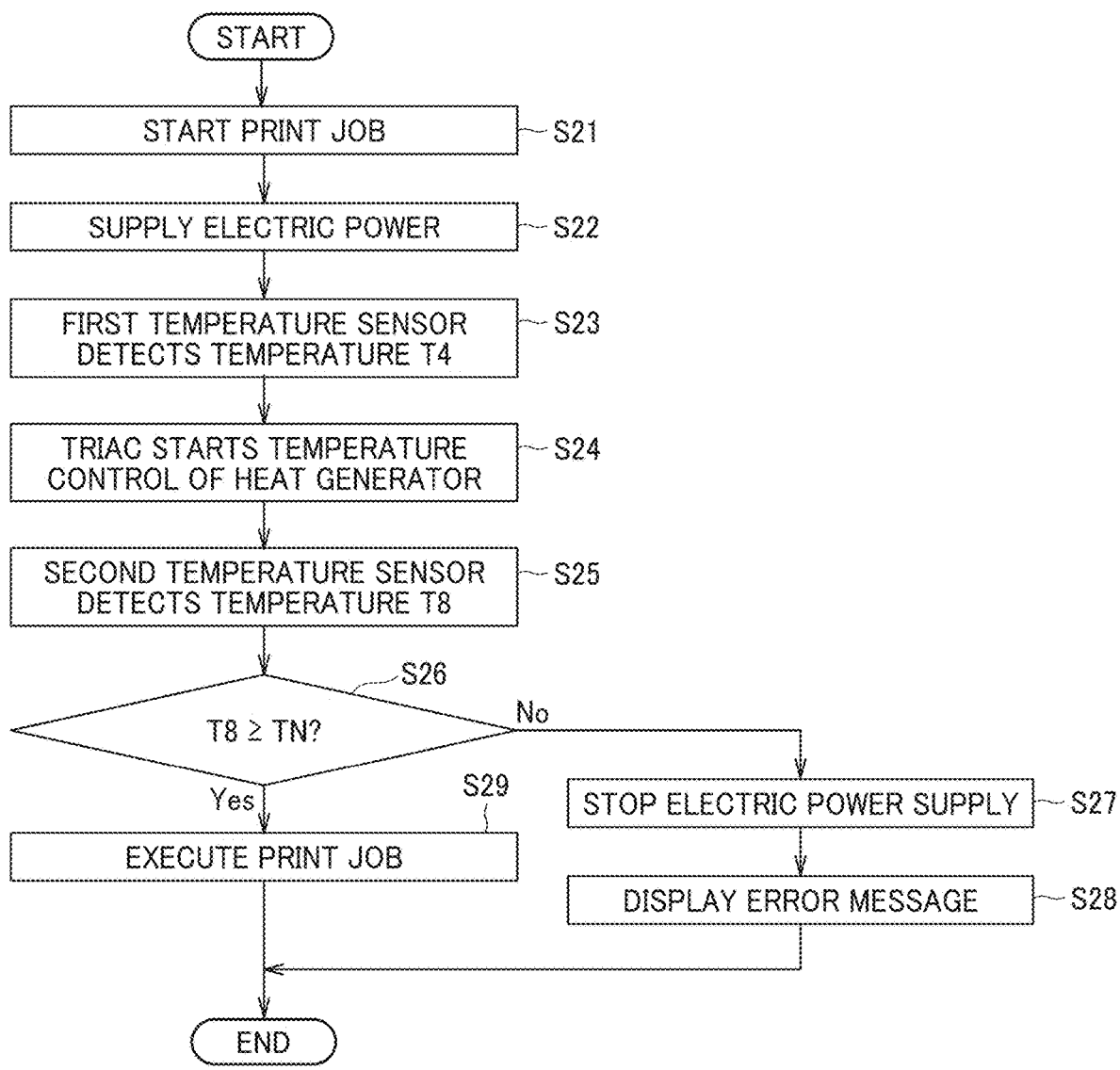

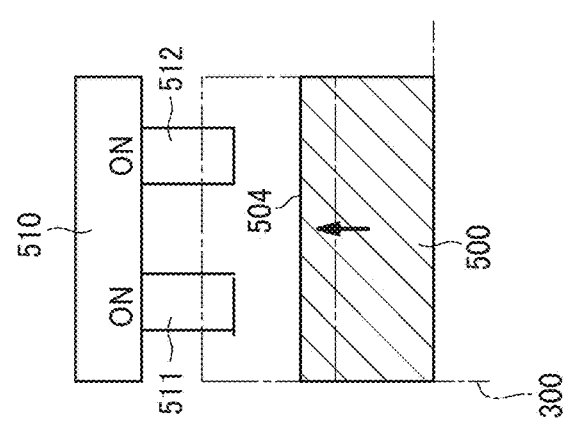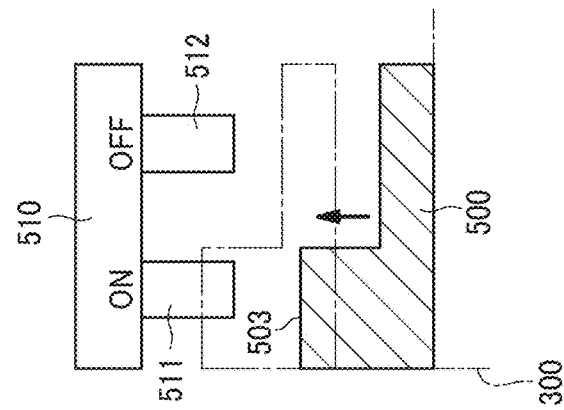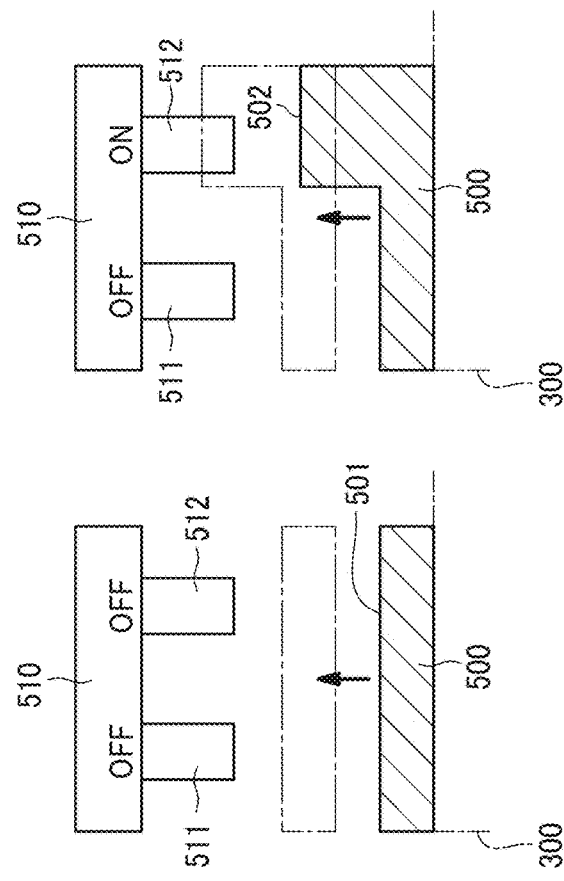

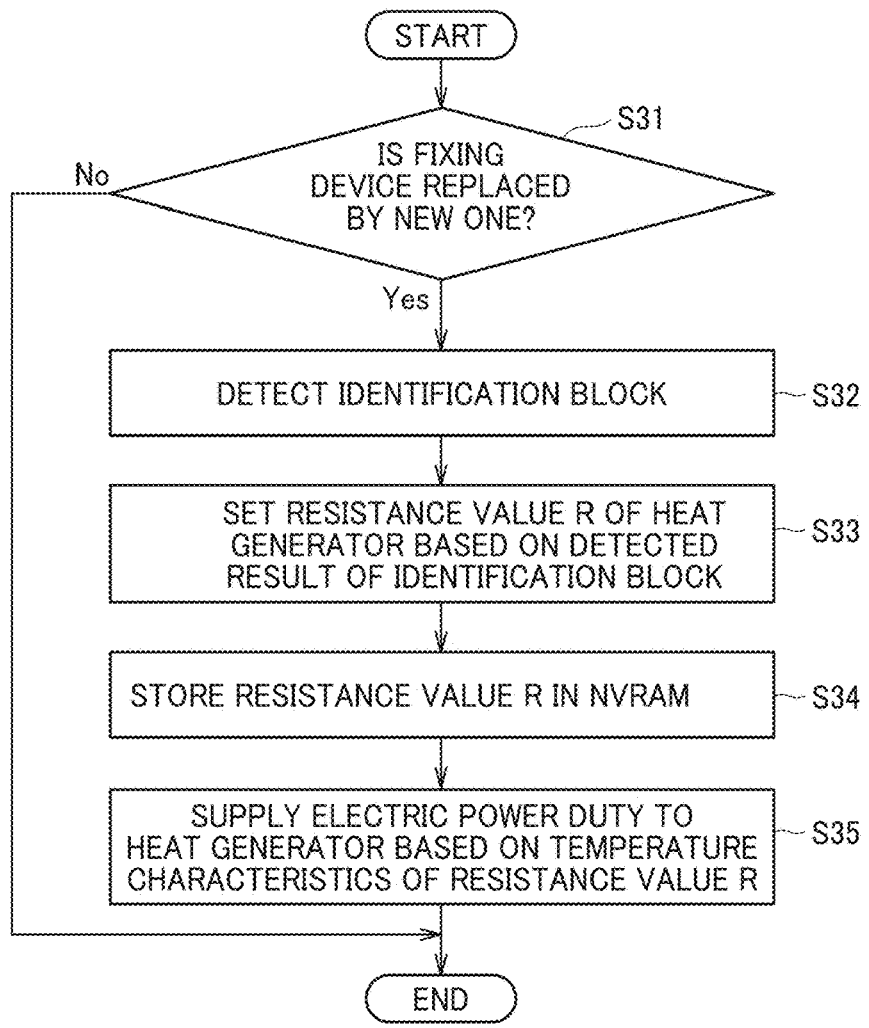
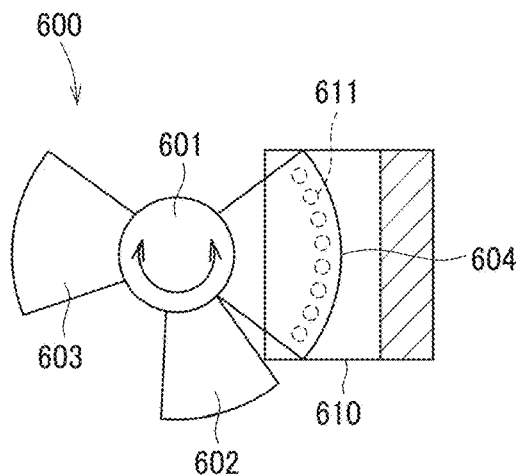
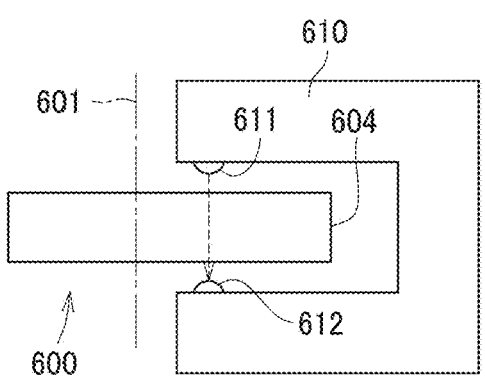
FIG. 8
FIG. 9A
FIG. 9B

IMAGE FORMING APPARATUS CONFIGURED TO CONTROL A LIGHTING DUTY OF A HEAT GENERATOR

CROSS-REFERENCE TO RELATED APPLICATIONS

This patent application is based on and claims priority pursuant to 35 U.S.C. § 119 to Japanese Patent Applications No. 2018-142677, filed on Jul. 30, 2018 and No. 2018-210567, filed on Nov. 8, 2018 in the Japanese Patent Office, the entire disclosure of which are hereby incorporated by reference herein.

BACKGROUND

Technical Field

The present disclosure relates to a heater including a resistance heat generator, a heating device using the heater, and an image forming apparatus using the heating device.

Background Art

Electrophotographic image forming apparatuses use various types of heating devices as fixing devices. In one type of fixing device, a heater is configured as a base and a resistance heat generator, and the heater heats a thin fixing belt having a low thermal capacity. The resistance heat generator is disposed on the base, which extends widthwise across the fixing belt.

SUMMARY

This specification describes an improved image forming apparatus that includes a heating device including a heat generator and a resistance value identifier, a body of the image forming apparatus in which the heating device is installed, a resistance value acquisition unit disposed on the body, a detector configured to detect detachment and attachment of the heating device from and to the body, and an electric power controller disposed in the body to control the heat generator. The resistance value identifier corresponds to a resistance value of the heat generator. The resistance value acquisition unit acquires the resistance value of the heat generator from the resistance value identifier. The electric power controller configured to cause the resistance value acquisition unit to acquire the resistance value of the heat generator when the detector detects the detachment and attachment of the heating device. The electric power controller is configured to change a lighting duty of the heat generator when the acquired resistance value of the heat generator is different from the resistance value prior to detection of the detachment and attachment of the heating device.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 6C is a flowchart illustrating control processes of the heater performed by a temperature sensor;

FIGS. 7A to 7D are schematic diagrams illustrating an identification block of the fixing device and a push switch on the body of the image forming apparatus;

FIG. 8 is a flowchart including a detection process of the identification block;

FIG. 9A is a plan view illustrating an identification feeler of the fixing device and an optical sensor on the body of an image forming apparatus; and FIG. 9B is a side view illustrating an identification feeler of the fixing device and an optical sensor on the body of an image forming apparatus.

Figure 1A:
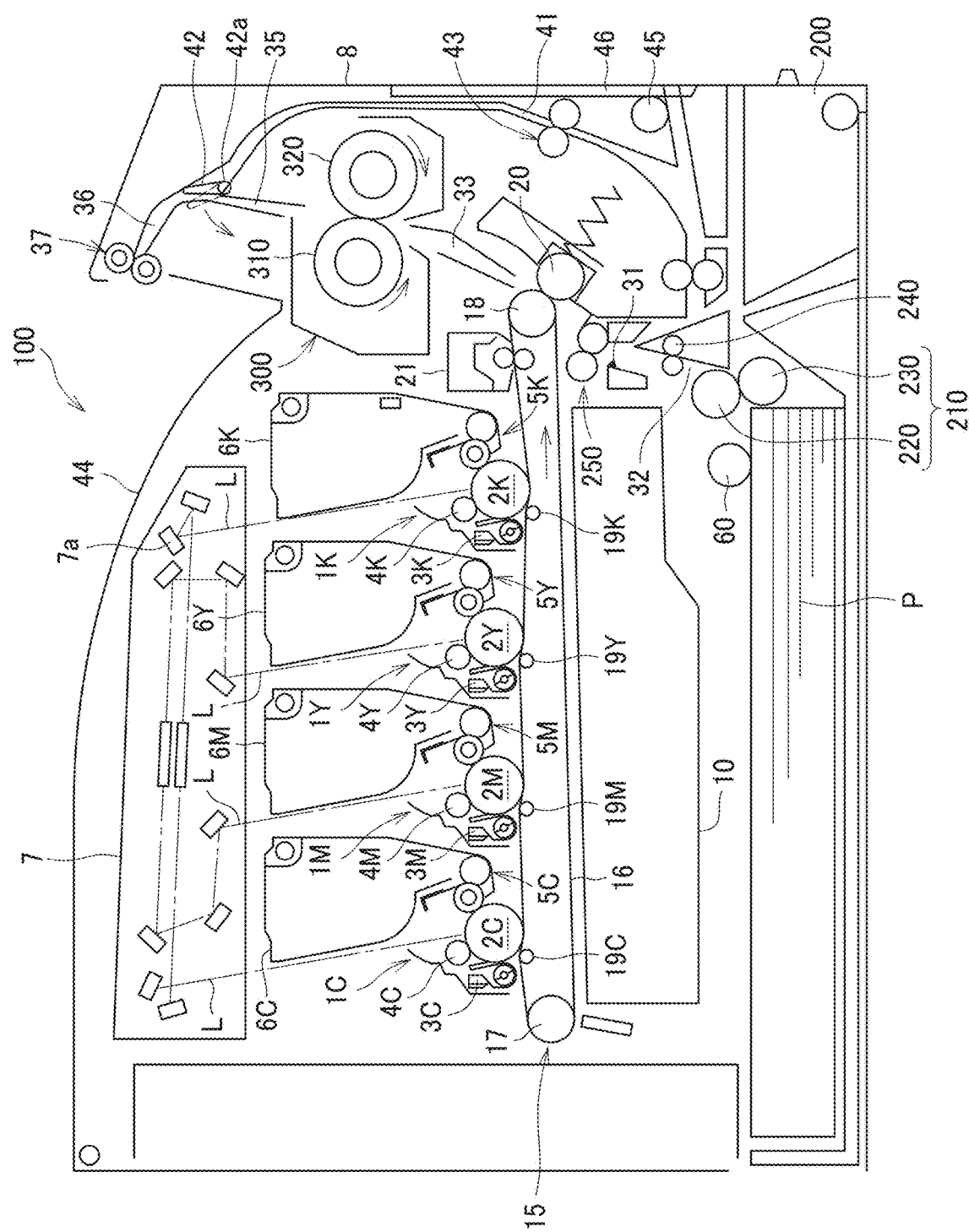
FIG. 1A is a schematic configuration view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings illustrating the following embodiments, the same reference numbers are allocated to elements having the same function or shape and redundant descriptions thereof are omitted below.

With reference to drawings, a description is given of a heater according to an embodiment of the present disclosure, a heating device using the heater, and an image forming apparatus such as a laser printer using the heater. The laser printer according to the present embodiment is just one embodiment, and thus the image forming apparatus is not limited to the laser printer. That is, the image forming apparatus can be a copier, a facsimile machine, a printer, a plotter, and a multifunction peripheral having at least two of copying, printing, facsimile transmission, plotting, and scanning capabilities; or an inkjet recording apparatus.

It is to be understood that an identical or similar reference character is given to identical or corresponding parts throughout the drawings, and redundant descriptions are omitted or simplified below. The dimensions, material, shape, and relative position in a description for each constituent component are examples. Unless otherwise specifically described, the scope of the present disclosure is not limited to those.

Although a "recording medium" is described as a "sheet" in the following embodiment, the "recording medium" is not limited to the sheet. Examples of the "recording medium" include not only the sheet but also an overhead projector (OHP) transparency, a fabric, a metallic sheet, a plastic film, and a prepreg sheet including carbon fibers previously impregnated with resin.

Examples of the "recording medium" include all mediums to which developer or ink can adhere, and so-called recording paper and recording sheets. Examples of the "sheet" include thick paper, a postcard, an envelope, thin paper, coated paper (e.g., coat paper and art paper), and tracing paper, in addition to plain paper.

The term "image formation" used in the following description means not only giving an image having a meaning, such as a character or a figure, to a medium but also giving an arbitrary image having no meaning, such as a pattern, to a medium. In addition, the image formation of the present disclosure includes the image formation by ink jet method and is not limited to the image formation by an electrophotography.

Configuration of Image Forming Apparatus

Figure 1B:
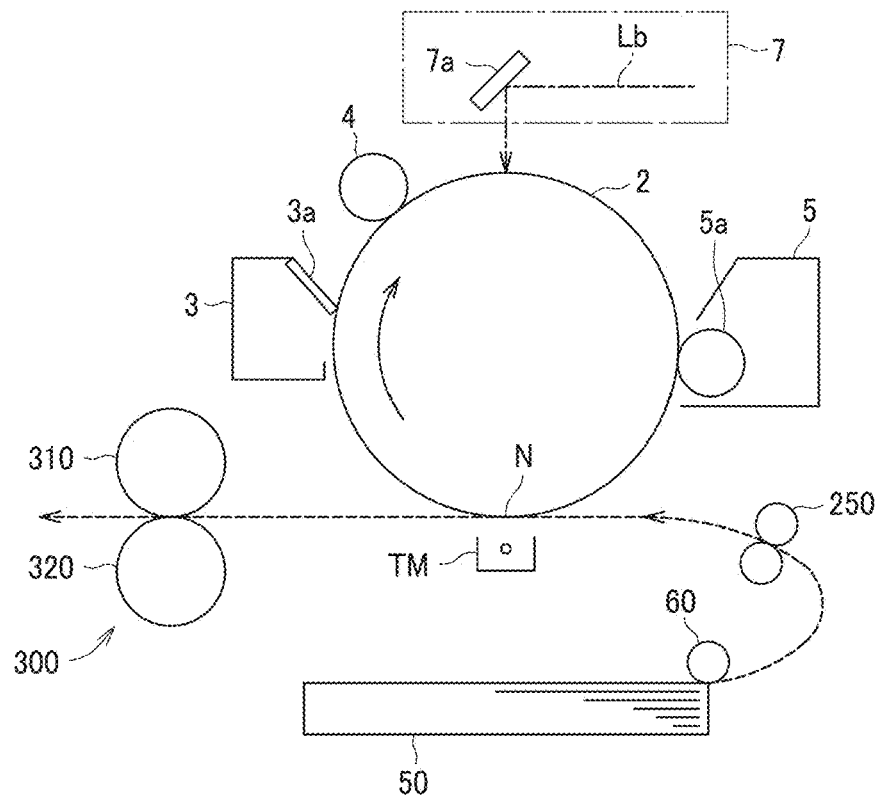
FIG. 1B is a schematic diagram to describe an image forming apparatus according to the embodiment of the present disclosure.

FIG. 1A is a schematic configuration view of a laser printer as an embodiment of the image forming apparatus 100 including the fixing device 300 or the heater according to the present disclosure. FIG. 1B is a schematic configuration view of an image forming section in the laser printer.

The image forming apparatus 100 includes four processing units 1K, 1Y, 1M, and 1C each as an image forming unit. Suffixes K, Y, M, and C are used to indicate respective colors of toner (e.g., black, yellow, magenta, and cyan) for the processing units. The processing units each form an image with respective developers of black (K), yellow (Y), magenta (M), and cyan (C) in color corresponding to the color separation components of a color image. Each of the processing units 1K, 1Y, 1M and 1C may include an image bearer 2, a photoconductor cleaner 3 including a cleaning blade 3a, a charging device 4 and a developing device 5 that includes a developer bearer 5a to bear developer including toner.

The processing units 1K, 1Y, 1M, and 1C respectively include toner bottles 6K, 6Y, 6M, and 6C containing different color toners. Since the processing units 1K, 1Y, 1M, and 1C have a similar structure except the color of toner, the configuration of one processing unit 1K is described below as representative and descriptions of the other processing units 1Y, 1M, and 1C are omitted.

The processing unit 1K includes an image bearer 2K such as a photoconductor drum, a photoconductor cleaner 3K, and a discharger. The processing unit 1K further includes a charging device 4K as a charger that uniformly charges the surface of the image bearer and a developing device 5K as a developing unit that renders visible an electrostatic latent image on the image bearer. The processing unit 1K is detachably attachable to a body of the image forming apparatus 100. Consumable parts of the processing unit 1 can be replaced at one time.

An exposure device 7 is disposed above the processing unit 1K, 1Y, 1M, and 1C in the image forming apparatus 100. The exposure device 7 performs writing and scanning based on image data, namely, irradiates the image bearer 2K with laser light Lb emitted by a laser diode and reflected by mirrors 7a based on the image data as reflected light L.

A transfer device 15 is disposed below the processing unit 1K, 1Y, 1M, and 1C in the present embodiment. The transfer device 15 corresponds to a transfer unit TM in FIG. 1B. Primary transfer rollers 19K, 19Y, 19M, and 19C are disposed opposite the image bearers 2K, 2Y, 2M, and 2C, respectively, to contact an intermediate transfer belt 16.

The intermediate transfer belt 16 is entrained around the primary transfer rollers 19K, 19Y, 19M, and 19C, a drive roller 18, and a driven roller 17 and rotates. A secondary transfer roller 20 is disposed opposite the drive roller 18 to contact the intermediate transfer belt 16. It is to be noted that, when the image bearers 2K, 2Y, 2M, and 2C are called primary image bearers, the intermediate transfer belt 16 is called a secondary image bearer to bear a synthesized image made from images formed on the respective image bearers 2K, 2Y, 2M, and 2C.

A belt cleaner 21 is disposed downstream from the secondary transfer roller 20 in a direction of rotation of the intermediate transfer belt 16. A cleaning backup roller is disposed opposite the belt cleaner 21 via the intermediate transfer belt 16.

A sheet feeder 200 including a tray 50 loaded with sheets P is disposed below the image forming apparatus 100. The sheet feeder 200 is configured as a recording-medium supply device and can house a sheaf of a large number of recording media sheets P. The sheet feeder 200 is configured as one unit together with a sheet feed roller 60 and a roller pair 210 as a conveyor for the sheets P.

The sheet feeder 200 is detachably inserted in the body of the image forming apparatus 100 to supply the sheet. The sheet feeding roller 60 and the roller pair 210 are disposed at upper portion of the sheet feeder 200 and convey the uppermost sheet P in the sheet feeder 200 to a sheet feeding path 32.

A registration roller pair 250 as a separation conveyor is disposed upstream from the secondary transfer roller 20 in a sheet conveyance direction and can temporarily stop the sheet P fed from the sheet feeder 200. Temporarily stopping the sheet P causes slack on the front end side of the sheet P and corrects a skew of the sheet P.

A registration sensor 31 is disposed upstream from the registration roller pair 250 in the sheet conveyance direction and detects a passage of a leading edge of the sheet. When a predetermined time passes after the registration sensor 31 detects the passage of the leading edge of the sheet, the sheet contacts the registration roller pair 250 and temporarily stops.

Conveyance rollers 240 are disposed at downstream side of the sheet feeder 200 to convey the sheet conveyed on the right side from the roller pair 210 upward. As illustrated in FIG. 1A, the conveyance rollers 240 conveys the sheet to the registration roller pair 250 upward.

The roller pair 210 includes a pair of an upper roller and a lower roller. The roller pair 210 can adopt a friction reverse roller (feed and reverse roller (FRR)) separation system or a friction roller (FR) separation system. In the FRR separation system, a separation roller (return roller) is applied a certain amount of torque in the counter sheet feeding direction from a driving shaft via a torque limiter and pressed against a feed roller to separate a sheet with the nip between the rollers. In the FR separation system, a separation roller (friction roller) is supported by a secured shaft via a torque limiter and pressed against a feed roller to separate a sheet with the nip between the rollers.

The roller pair 210 in the present embodiment adopts the FRR separation system. That is, the roller pair 210 includes an upside feed roller 220 that conveys the sheet toward the image forming apparatus and a downside separation roller 230 that gives a driving force in a reverse direction of the upside feed roller 220 with a driving shaft through a torque limiter.

The separation roller 230 is pressed against the feed roller 220 by a pressing member such as a spring. A clutch transmits a driving force of the feed roller 220 to the feed roller 220, and the sheet feeding roller 60 rotates left in FIG. 1A.

The registration roller pair 250 sends the sheet P that contacts the registration roller pair 250 and has the slack on the front end side of the sheet P toward the secondary transfer nip between the secondary transfer roller 20 and the drive roller 18, which is illustrated as a transfer nip N in FIG. 1B, at a suitable timing to transfer the toner image on the intermediate transfer belt 16 onto the sheet P. A bias applied at the secondary transfer nip electrostatically transfers the toner image formed on the intermediate transfer belt 16 onto the sent sheet P at a desired transfer position with high accuracy.

A post-transfer conveyance path 33 is disposed above the secondary transfer nip between the secondary transfer roller 20 and the drive roller 18. The fixing device 300 is disposed near an upper end of the post-transfer conveyance path 33. The fixing device 300 includes a fixing belt 310 containing the heater and a pressure roller 320 as a pressing member that rotates while pressing against the fixing belt 310 with a predetermined pressure. The fixing device 300 may have other configurations illustrated in FIGS. 2B to 2D described later.

A post-fixing conveyance path 35 is disposed above the fixing device 300 and branches into a sheet ejection path 36 and a reverse conveyance path 41 at the upper end of the post-fixing conveyance path 35. At this branching portion, the switching member 42 is disposed and pivots on a pivot shaft 42a. At an opening end of the sheet ejection path 36, a pair of sheet ejection rollers 37 are disposed.

The reverse conveyance path 41 begins from the branching portion and converges into the sheet feeding path 32. Additionally, a reverse conveyance roller pair 43 is disposed midway in the reverse conveyance path 41. An upper face of the image forming apparatus 100 is recessed to an inner side of the image forming apparatus 100 and serves as an output tray 44.

A powder container 10 such as a toner container is disposed between the transfer device 15 and the sheet feeder 200. The powder container 10 is removably installed in the apparatus body of the image forming apparatus 100.

Suitable sheet conveyance in the image forming apparatus 100 according to the present embodiment needs a predetermined length from the sheet feed roller 60 to the secondary transfer roller 20. The powder container 10 is disposed in a dead space caused by that distance to keep the entire image forming apparatus compact.

A transfer cover 8 is disposed above the sheet feeder 200 and on a front side to which the sheet feeder 200 is pulled out. The transfer cover 8 can be opened to check an interior of the image forming apparatus 100. The transfer cover 8 includes a manual sheet feeding roller 45 for manual sheet feeding and a manual sheet feeding tray 46 for the manual sheet feeding.

Side Cover

Figure 1C:
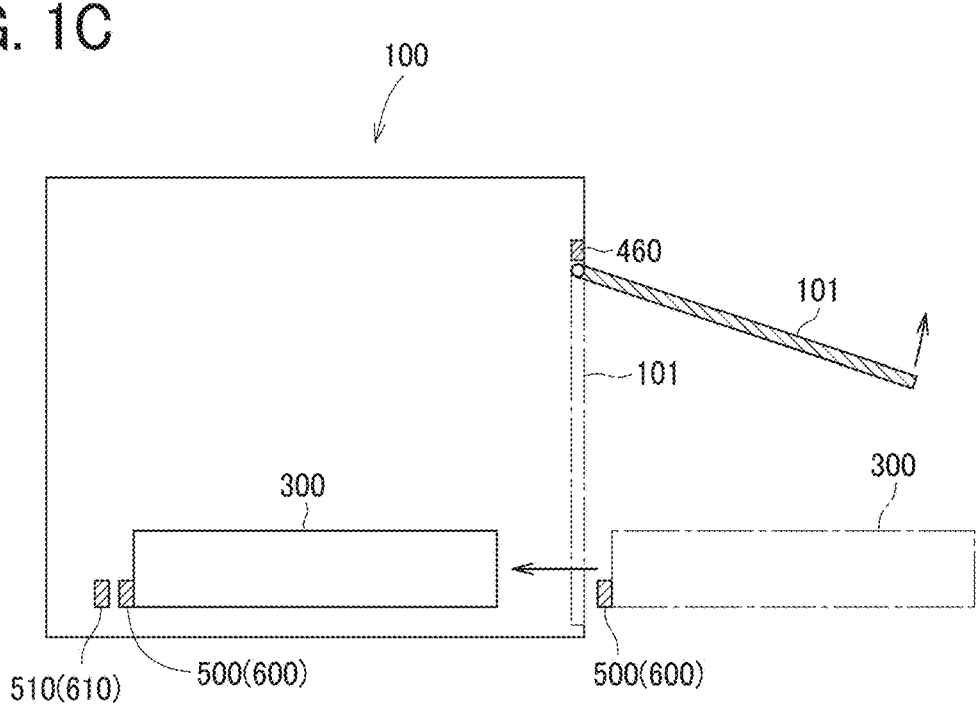
FIG. 1C is a plan view illustrating a method of attaching and detaching the fixing device to and from the image forming apparatus.

FIG. 1C is a plan view illustrating a method of attaching and detaching the fixing device 300 to and from the image forming apparatus. The fixing device 300 in the image forming apparatus 100 may be replaced when it is spent, has failed, or for some other reason. Therefore, as illustrated in FIG. 1C, the image forming apparatus 100 includes a side cover 101 as an openably closable exterior member on the side of the body of the image forming apparatus 100 for maintenance.

When the user or service personnel set the fixing device 300, the user or service personnel open the side cover 101 and slides the fixing device 300 in a direction indicated by arrow. Replacing the fixing device 300 with a new one resets a life counter of a heat generator 360 and enables subsequent use of the image forming apparatus 100.

Although the image forming apparatus 100 according to the present embodiment does include a new device detector to detect replacement of the fixing device 300, the image forming apparatus 100 may use a detector 460 that detects opening and closing of the side cover 101 as a detector to detect possible replacement of the fixing device 300.

When the heat generator 360 in the fixing device 300 is broken, the fixing device 300 is replaced with a new one as described above, or only the heat generator 360 is replaced with a new heat generator 360. In this case, generally, replacement of the heat generator 360 is not replacement by the user but replacement by service personnel.

Operation of Image Forming Apparatus

Referring to FIG. 1A, operation of the image forming apparatus 100 according to the present embodiment is described below. Initially, single-side printing is described.

Referring to FIG. 1A, the sheet feed roller 60 rotates in response to a sheet feeding signal from a controller of the image forming apparatus 100. The sheet feed roller 60 separates the uppermost sheet from a sheaf of sheets P loaded in the sheet feeder 200 and sends the uppermost sheet out to the sheet feeding path 32.

After the sheet feed roller 60 and the roller pair 210 send the sheet P, when the leading edge of the sheet P reaches a nip of the registration roller pair 250, the sheet P forms the slack to correct a skew of the leading edge of the sheet P and temporarily stops to synchronize at the optimal timing for transferring a toner image formed on the intermediate transfer belt 16 onto the sheet P.

When the sheet P is fed from the manual sheet feeding tray 46, the sheets P of the sheet bundle loaded on the manual sheet feeding tray 46 are fed one by one from the uppermost sheet placed on top of the sheet bundle by the manual sheet feeding roller 45. Then, the sheet P passes part of the reverse conveyance path 41 to be conveyed to the nip of the registration roller pair 250. The subsequent operations are the same operations as the sheet feeding operations from the sheet feeder 200.

As to image formation, operations of the processing unit 1K is described as a representative. First, the charging device 4K uniformly charges the surface of the image bearer 2K to high potential. The exposure device 7 emits a laser light L onto the surface of the image bearer 2K according to image data.

On the surface of the image bearer 2K, a portion irradiated with the laser beam L is reduced in potential, thus forming an electrostatic latent image. The developing device 5K includes a developer bearer to bear developer including toner, and the developer bearer supplies black toner from the toner bottle 6K onto the portion of the image bearer 2K bearing the electrostatic latent image to form a black toner image on the surface of the image bearer 2K.

The black toner image formed on the image bearer 2K is transferred onto the intermediate transfer belt 16.

The photoconductor cleaner 3K removes toner remaining on the surface of the image bearer 2K after the primary-transfer process. The removed residual toner is conveyed by a waste toner conveyance unit and collected to a waste toner container in the processing unit 1K. The discharging device discharges the remaining charge on the image bearer 2K from which the remaining toner is removed by the photoconductor cleaner 3K.

Similarly, toner images are formed on the image bearers 2Y, 2M, and 2C in the processing unit 1Y, 1M, and 1C for the colors, and color toner images are transferred to the intermediate transfer belt 16 such that the color toner images are superimposed on each other.

The intermediate transfer belt 16 to which the color toner images are transferred and superimposed reaches the secondary transfer nip between the secondary transfer roller 20 and the drive roller 18. The registration roller pair 250 rotates to nip the sheet P contacting the registration roller pair 250 at a predetermined timing and conveys the sheet P to the secondary transfer nip of the secondary transfer roller 20 at a suitable timing to transfer the transferred and superimposed toner image formed on the intermediate transfer belt 16 onto the sheet P. In this manner, the toner image on the intermediate transfer belt 16 is transferred to the sheet P sent out by the registration roller pair 250.

The sheet P having the transferred toner image is conveyed to the fixing device 300 through the post-transfer conveyance path 33. The sheet P conveyed to the fixing device 300 is sandwiched by the fixing belt 310 and the pressure roller 320. Then, heating and pressing fixes the unfixed toner image to the sheet P. The sheet P fixed the toner image is sent out from the fixing device 300 to the post-fixing conveyance path 35.

The switching member 42 opens the upper end of the post-fixing conveyance path 35, as indicated with a solid line of FIG. 1A, when the fixing device 300 sends out the sheet P. The sheet P sent from the fixing device 300 is sent to the sheet ejection path 36 via the post-fixing conveyance path 35. The pair of sheet ejection rollers 37 nips the sheet P sent out to the sheet ejection path 36 and rotates to eject the sheet P to the output tray 44. Then, the single-sided printing finishes.

Next, duplex printing is described. Like the single-sided printing described above, the fixing device 300 sends out the sheet P to the sheet ejection path 36. In the duplex printing, the pair of sheet ejection rollers 37 rotates to convey a part of the sheet P outside the image forming apparatus 100.

When the trailing edge of the sheet P passes through the sheet ejection path 36, the switching member 42 pivots on the pivot shaft 42a as indicated with a dotted line in FIG. 1A to close the upper end of the post-fixing conveyance path 35. When the upper end of the post-fixing conveyance path 35 is closed, nearly simultaneously, the pair of sheet ejection rollers 37 rotates in reverse to convey the sheet P to an inner side of the image forming apparatus 100, that is, to the reverse conveyance path 41.

The sheet P sent out to the reverse conveyance path 41 reaches the registration roller pair 250 via the reverse conveyance roller pair 43. The registration roller pair 250 sends out the sheet P to the secondary transfer nip at a suitable timing to transfer the toner image formed on the intermediate transfer belt 16 onto the other surface of the sheet P to which no toner image has been transferred.

When the sheet P passes through the secondary transfer nip, the secondary transfer roller 20 and the drive roller 18 transfer the toner image to the other surface of the sheet P to which no toner image has been transferred (back face). The sheet P having the transferred toner image is conveyed to the fixing device 300 through the post-transfer conveyance path 33.

In the fixing device 300, the sheet P is sandwiched by the fixing belt 310 and the pressure roller 320, and heat and pressure are applied to fix the unfixed toner image formed on the back face of the sheet P. The sheet P having the toner images fixed to both front and back faces of the sheet P in this manner is sent out from the fixing device 300 to the post-fixing conveyance path 35.

The switching member 42 opens the upper end of the post-fixing conveyance path 35, as indicated with the solid line of FIG. 1A, when the fixing device 300 sends out the sheet P. The sheet P sent from the fixing device 300 is sent to the sheet ejection path 36 via the post-fixing conveyance path 35. The pair of sheet ejection rollers 37 nips the sheet P sent out to the sheet ejection path 36 and rotates to eject the sheet P to the output tray 44 to finish duplex printing.

After the toner image on the intermediate transfer belt 16 is transferred onto the sheet P, there is toner remaining on the intermediate transfer belt 16. The belt cleaner 21 removes the remaining toner from the intermediate transfer belt 16. The waste toner conveyance unit conveys the toner removed from the intermediate transfer belt 16 to the powder container 10, and the toner is collected inside the powder container 10.

Fixing Device

Next, the heater and first to fourth fixing devices 300 according to the embodiments of the present disclosure are described below. The heater according to the present embodiment heats the fixing belt 310 in the fixing device 300.

Figure 2A:
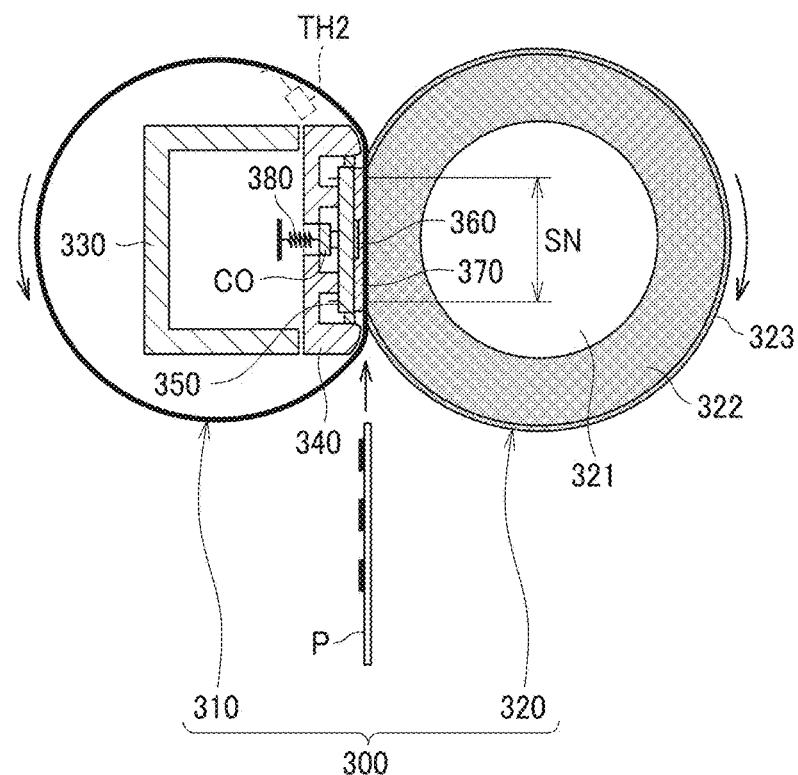
FIG. 2A is a cross-sectional view illustrating a first fixing device according to the embodiment of the present disclosure.

As illustrated in FIG. 2A, the first fixing device includes a thin fixing belt 310 having low thermal capacity and a pressure roller 320. The fixing belt 310 includes, for example, a tubular base made of polyimide (PI), the tubular base having an outer diameter of 25 mm and a thickness of from 40 to 120 μm.

On the outermost layer of the fixing belt 310, a release layer made of a fluorine-based resin, such as a perfluoroalkoxy alkane (PFA) or polytetrafluoroethylene (PTFE), having a thickness of from 5 to 50 μm, is formed in order to improve durability and ensure releasability. An elastic layer made of rubber having a thickness of from 50 to 500 μm may be provided between the base and the release layer.

The tubular base of the fixing belt 310 is not limited to polyimide, and thus may be made of heat-resistant resin, such as polyetheretherketone (PEEK), or a metal, such as nickel (Ni) or stainless steel (SUS). The inner circumferential surface of the fixing belt 310 may be coated with polyimide or polytetrafluoroethylene (PTFE) as a slide layer.

The pressure roller 320 having, for example, an outer diameter of 25 mm, includes a solid iron cored bar 321, an elastic layer 322 on the surface of the cored bar 321, and a release layer 323 formed on the outside of the elastic layer 322. The elastic layer 322 is made of silicone rubber and has, for example, a thickness of 3.5 mm. Preferably, the release layer 323 is formed by a fluororesin layer having, for example, a thickness of approximately 40 μm on the surface of the elastic layer 322 to improve releasability. A biasing member presses the pressure roller 320 against the fixing belt 310.

A stay 330 and a holder 340 are disposed axially inside the inner circumferential surface of the fixing belt 310. The stay 330 is configured by a channeled metallic member, and the two side plates of the fixing device 300 support the two end portions of the stay 330. The stay 330 is subjected to pressure from the pressure roller 320 to form a secure and stable fixing nip SN.

The holder 340 holds a base 350 of the heater and is supported by the stay 330. Preferably, the heater holder 340 is made of heat-resistant resin having low thermal conduction, such as a liquid crystal polymer (LCP). This reduces heat transfer from the heater to the heater holder 340 and enables efficient heating of the fixing belt 310.

The holder 340 has a shape that supports two portions of the base 350 near both end portions in a short side direction of the base 350 to avoid contact with a high-temperature portion of the base 350. This shape further reduces an amount of heat reaching the holder 340 and enables the fixing belt 310 to be heated efficiently.

Heater

Figure 3A:
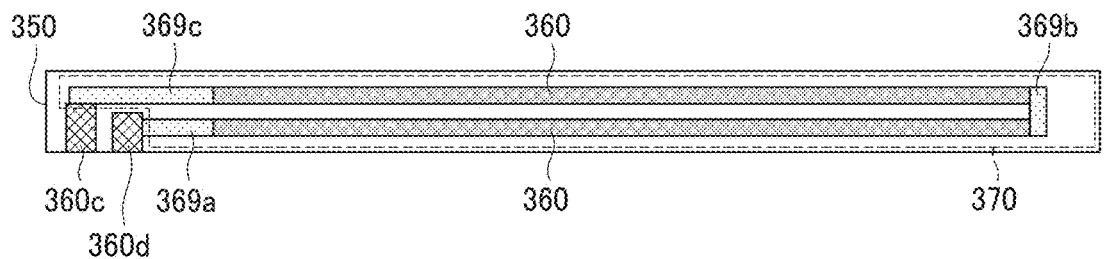
FIG. 3A is a plan view illustrating a resistance heat generator including electrodes at one end.
Figure 3B:
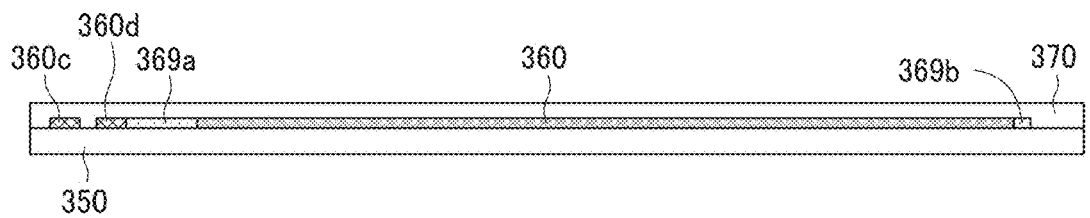
FIG. 3B is a sectional view illustrating the resistance heat generator including the electrodes at one end.

The heater includes the heat generator 360 configured by a resistance heat generator. As illustrated in FIGS. 3A and 3B, the heat generator 360 is a thin, elongated metallic plate formed on the base 350 covered with an insulating material.

Low-cost aluminum or stainless steel is preferable as the material of the base 350. However, the material of the base 350 is not limited to metal and alternatively may be a ceramic, such as alumina or aluminum nitride, or a nonmetallic material having excellent thermal resistance and insulating properties, such as glass or mica.

To improve thermal uniformity of the heater and image quality, the base 350 may be made of a material having high thermal conductivity, such as copper, graphite, or graphene. The heater according to the present embodiment uses an alumina base having a lateral width of 8 mm, a longitudinal width of 270 mm, and a thickness of 1.0 mm.

Figure 4A:
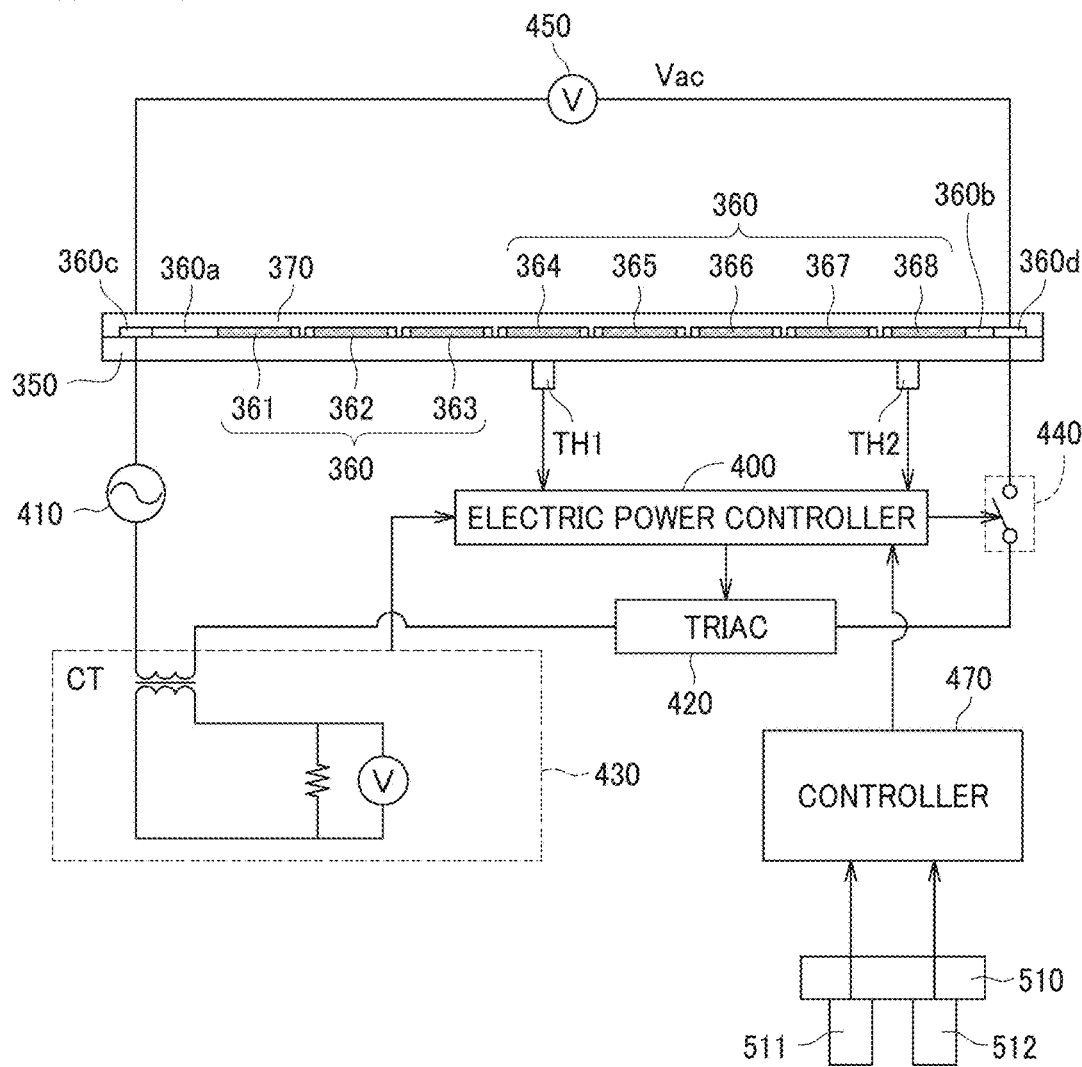
FIG. 4A is an explanatory diagram illustrating a heater, a power supply circuit, and an electric power controller.

Specifically, the heat generator 360 in FIGS. 3A and 3B is formed in two parallel lines in the longitudinal direction of the base 350. One end portions of the two parallel lines of the heat generator 360 on one end of the base 350 are connected to electrodes 360c and 360d to supply power via power supply lines 369a and 369c respectively, and the power supply lines 369a and 369c have small resistance value and extend in the longitudinal direction from the one end portions of the heat generator 360 on the base 350. The electrodes 360c and 360d are connected to a power supply device including an AC power supply 410 as illustrated in FIG. 4A.

The other end portions of the two parallel lines of the heat generator 360 on the other end of the base 350 are connected each other by a power supply line 369b having small resistance value and extending in the short side direction of the base 350 on the other end of the base 350. As a result, the heat generator 360 has a form turned back in the longitudinal direction of the base 350. The heat generator 360, the electrodes 360c and 360d, and the power supply lines 369a to 369c are formed by screen-printing with a predetermined line width and thickness.

The heat generator 360 may be made by coating the base 350 with a paste in which silver (Ag) or silver palladium (AgPd) and glass powder are mixed, by screen printing, and after that, by baking the heat generator and the base 350. The resistance value of the heat generator 360 may be, for example, 10Ω at general temperature. In addition to the above-described materials, a silver alloy (AgPt), ruthenium oxide (RuO2), or the like may also be used as a resistance material of the heat generator 360.

The surfaces of the heat generator 360 and the power supply lines 369a to 369c are covered with a thin overcoat layer or an insulation layer 370. The insulation layer 370 secures the slidability between the heater and the fixing belt 310 and the insulation between the fixing belt 310 and the heat generator 360 and the power supply lines 369a to 369c.

A material of the insulation layer 370 may be, for example, a thermal resistance glass having a thickness of 75 μm. The heat generator 360 transfers heat to the fixing belt 310 that contacts the insulation layer 370, raise the temperature of the fixing belt 310, and heats the unfixed toner image on the sheet P conveyed to the fixing nip SN to fix the toner image on the sheet P.

Heat Generator Configured by Positive Temperature Coefficient (PTC) Elements

As illustrated in FIGS. 3C to 3H, the heat generator 360 may be configured by electrically connecting in parallel a plurality of (eight in the illustrated example) PTC elements 361 to 368 which are formed in a serpentine shape with a narrow line width. In this case, to set the total resistance value of the heat generator 360 to 10Ω, the resistance value of each of the PTC elements 361 to 368 becomes as large as 80Ω.

Obtaining this large resistance value involves smaller line widths of the PTC elements 361 to 368, smaller thicknesses of the PTC elements 361 to 368, and more meandering of the PTC elements 361 to 368 as far as possible. However, this causes issues such as increased variation in line widths and thicknesses of the PTC elements 361 to 368, which results in a large variation in a resistance value of the heat generator 360. The heater according to the embodiment of the present disclosure effectively reduces such variation in the resistance value of the heat generator 360.

The PTC elements are made of materials having a positive temperature coefficient of resistance. The PTC element is characterized in that an increase in temperature causes an increase in resistance, a decrease in a current I, and a decrease in the heater output. The temperature coefficient of resistance may be, for example, 1500 parts per million (PPM). The temperature coefficient of resistance may be stored in a memory such as a non-volatile memory of the electric power controller 400 described later.

The PTC elements 361 to 368 illustrated in FIGS. 3C to 3H are arranged straight at regular intervals in the longitudinal direction of the base 350. Power supply lines 360a and 360b each having a small resistance value are arranged straight mutually in parallel on both sides in the short side direction of the PTC elements 361 to 368. Both ends of each of the PTC elements 361 to 368 are connected to the power supply lines 360a and 360b. At each of ends of the power supply lines 360a and 360b, the electrodes 360c and 360d are formed and connected to the power supply device including the AC power supply 410 as illustrated in FIG. 4A.

Similar to the above-described heat generator 360 in FIGS. 3A and 3B that is two parallel lines connected in series, the PTC elements 361 to 368 and the power supply lines 360a and 360b are covered with the thin insulation layer 370. The insulation layer 370 may be, for example, a thermal resistance glass having a thickness of 75 μm. The insulation layer 370 insulates and protects the PTC elements 361 to 368 and the power supply lines 360a and 360b and secures the slidability between the fixing belt 310 and the PTC elements 361 to 368 and the power supply lines 360a and 360b.

The PTC elements 361 to 368 may be made, for example, by coating on the base 350 with paste in which silver palladium (AgPd) and glass powder are compounded, by screen printing, and after that, by baking the base 350. In the present embodiment, each resistance value of the PTC elements 361 to 368 is set to 80Ω at room temperature, and the total resistance value results in 10Ω.

As the material of the PTC elements 361 to 368, other than the above material, a resistance material, such as silver alloy (AgPt) or ruthenium oxide (RuO2) may be used. Silver (Ag), silver palladium (AgPd) or the like may be used as a material of the power supply lines 360a and 360b and the electrodes 360c and 360d. Screen-printing such a material forms the power supply lines 360a and 360b and the electrodes 360c and 360d.

The PTC elements 361 to 368 transfer heat to the fixing belt 310 that contacts the insulation layer 370, raise the temperature of the fixing belt 310, and heats the unfixed toner image on the sheet P conveyed to the fixing nip SN to fix the toner image on the sheet P.

Figure 3C:
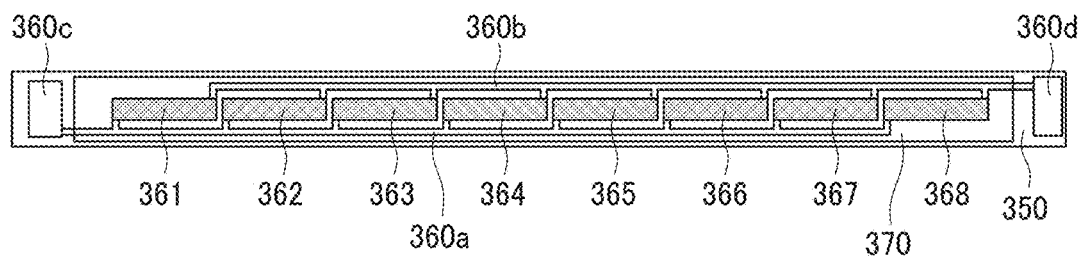
FIG. 3C is a plan view illustrating a resistance heat generator including electrodes at both ends and resistor elements disposed in parallel.
Figure 3D:
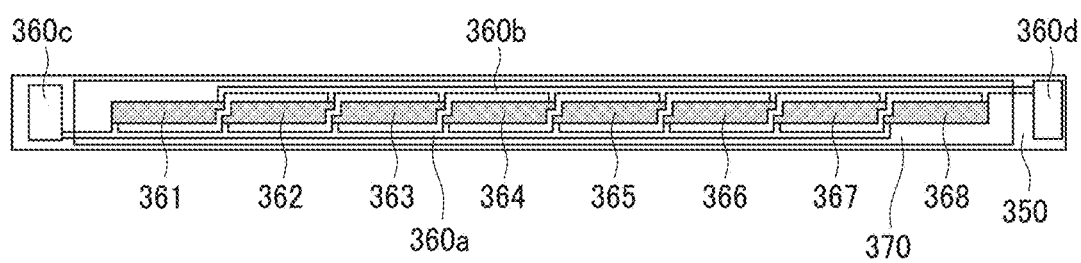
FIG. 3D is a plan view illustrating a resistance heat generator including electrodes at both ends and resistor elements disposed in parallel.

As illustrated in FIG. 3D, the PTC elements 361 to 368 are arranged in the longitudinal direction to form eight sections and electrically connected in parallel to each other. Although the PTC elements 361 to 368 each have a rectangular shape in FIG. 3C, a calcination pattern of each of the PTC elements 361 to 368 may have a turndown serpentine shape to obtain a desired output, that is, a desired resistance value.

Figure 5A:
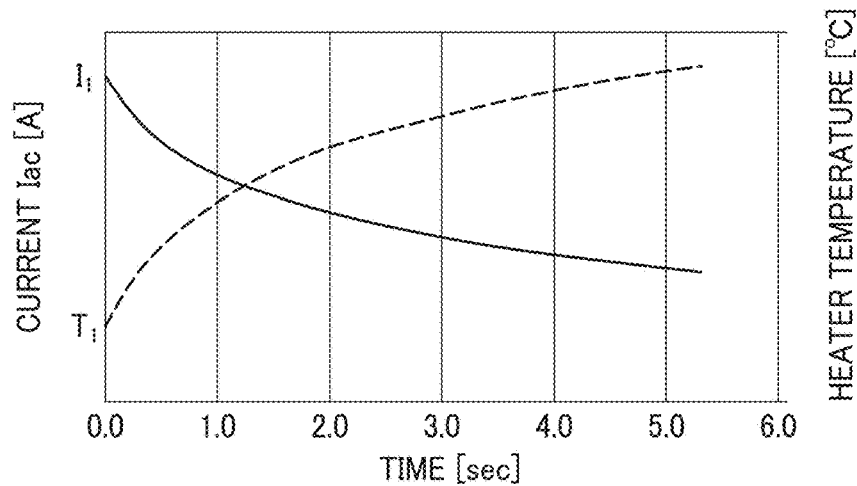
FIG. 5A is a graph illustrating changes of temperature and current in the resistance heat generator.

Use of the PTC elements 361 to 368 reduces an increase in temperature in the PTC element in which small sheets do not contact when the small sheets pass through the fixing device 300 because the relation of the resistance heat generator between resistance and temperature illustrated in FIG. 5A reduces heat generation amount in the PTC element in which the small sheets do not contact. For example, printing sheets smaller than a width corresponding to all PTC elements 361 to 368, for example, sheets having width corresponding to the PTC elements 363 to 366, raises temperatures in the PTC elements 361, 362, 367, and 368 disposed outside the sheets because the sheets do not draw heat from the PTC elements 361, 362, 367, and 368. Raising temperatures in the PTC elements 361, 362, 367, and 368 causes increase in resistance values of the PTC elements 361, 362, 367, and 368.

Because a constant voltage is applied to the PTC elements 361 to 368, the increase in resistance values relatively reduces outputs of the PTC elements 361, 362, 367, and 368 disposed outside the width of the sheet, as a result, increase in temperature in end portions outside the sheets is prevented. If the PTC elements 361 to 368 are electrically connected in series, to prevent the resistance heat generator outside the width of the sheets from raising temperature in continuous printing, there is no method except a method of reducing a print speed. Electrically connecting the PTC elements 361 to 368 in parallel can prevent the temperature in the portion outside the sheets from raising and keep the print speed.

Figure 3E:
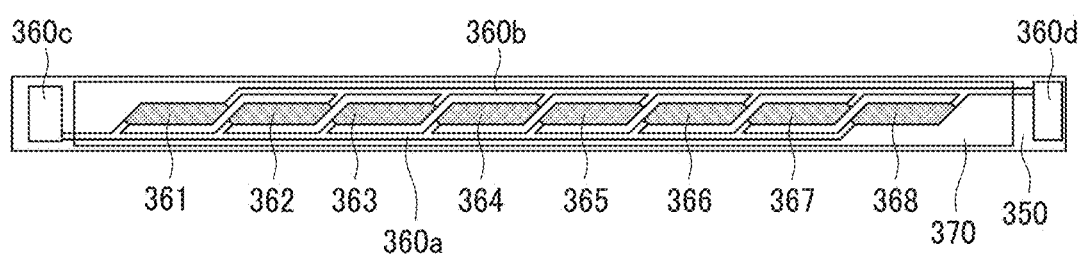
FIG. 3E is a plan view illustrating a resistance heat generator including electrodes at both ends and resistor elements disposed in parallel.

An arrangement of the PTC elements 361 to 368 is not limited to the arrangement illustrated in FIG. 3C. In FIG. 3C, since gaps extending in the short side direction between the PTC elements 361 to 368 do not generate heat, temperature decrease may occur in the gaps, which may cause uneven fixing. In contrast, ends of the PTC elements 361 to 368 in the longitudinal direction overlap as illustrated in FIGS. 3D and 3E.

In FIG. 3D, an L-shaped cut-away step is formed at each of the end portions of the PTC elements 361 to 368 so that the step overlaps the step of the end portion of the adjacent PTC element. In FIG. 3E, an oblique cut-away inclination is formed at each of the end portions of the PTC elements 361 to 368 so that the inclination overlaps the inclination of the end portion of the adjacent PTC element. Mutually overlapping the end portions of the PTC elements 361 to 368 in this manner can reduce temperature decrease in the gaps between the PTC elements.

Figure 3F:
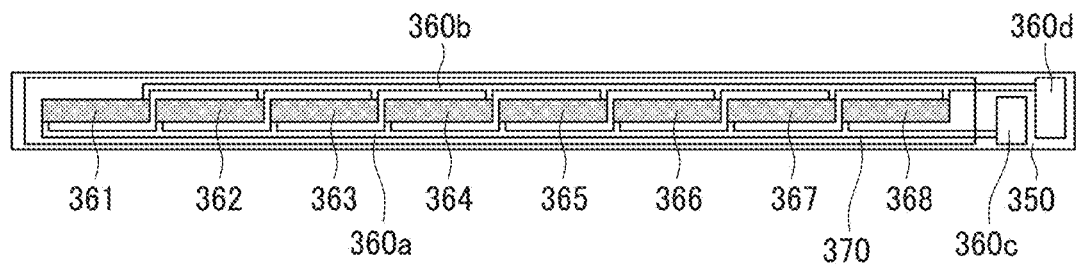
FIG. 3F is a plan view illustrating a resistance heat generator including electrodes at one end and resistor elements disposed in parallel.
Figure 3G:
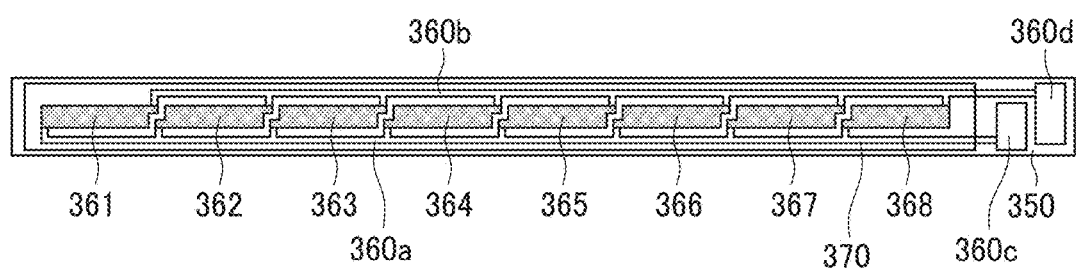
FIG. 3G is a plan view illustrating a resistance heat generator including electrodes at one end and resistor elements disposed in parallel.
Figure 3H:
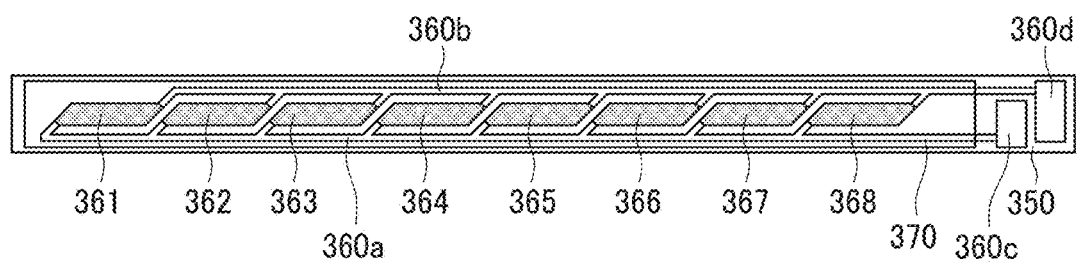
FIG. 3H is a plan view illustrating a resistance heat generator including electrodes at one end and resistor elements disposed in parallel.

The electrodes 360c and 360d may be disposed on one side of the PTC elements 361 to 368 as illustrated in FIGS. 3F to 3H instead of being disposed on both sides of the PTC elements 361 to 368. Disposing the electrodes 360c and 360d on the one side in this manner reduces a size of the fixing device in the longitudinal direction, which results in space conservation.

Temperature Sensor

The heater according to the present embodiment includes a first temperature sensor TH1 and a second temperature sensor TH2 as temperature detectors to detect the temperatures of the resistance heat generators. The temperature sensors TH1 and TH2 may each include, for example, a thermistor.

As illustrated in FIG. 4A, the first temperature sensor TH1 and the second temperature sensor TH2 are disposed so that a spring 380 presses each of the first temperature sensor TH1 and the second temperature sensor TH2 against a back side of the base 350. The first temperature sensor TH1 is used to control the temperature, and the second temperature sensor TH2 is used for safety. Both the two temperature sensors TH1 and TH2 may be contact thermistors CO having a thermal time constant of less than one second.

The first temperature sensor TH1 to control the temperature is disposed in a heating region of the PTC element 364, which is the fourth PTC element from the left end in FIG. 4A, as the first resistance heat generator disposed in a center portion in the longitudinal direction and in a width of the minimum sheet. The second temperature sensor TH2 for safety is disposed in the heating region of the PTC element 368, which is the eighth PTC element from the left end, or in the heating region of the PTC element 361, which is the first PTC element from the left end. The PTC elements 361 and 368 work as a second resistance heat generator disposed in an endmost portion in the longitudinal direction.

The two temperature sensors TH1 and TH2 are disposed in the respective regions of the PTC elements 364 and 368, avoiding a gap between the PTC elements where the amount of heat generation decreases. This arrangement improves temperature controllability, and also facilitates disconnection detection when a disconnection occurs in any one of the resistance heat generators.

The first temperature sensor TH1 may be disposed in the heating region of any one of the PTC elements 363, 365, and 366. The second temperature sensor TH2 may be disposed in the heating region of the PTC element 362 that is the second PTC element from the left end or in the heating region of the PTC element 367 that is the seventh PTC from the left end as long as their heating regions are included in an end region in the longitudinal direction and may not be necessarily disposed at the farthest end portions in the longitudinal direction.

Power Supply Circuit

Figure 4B:
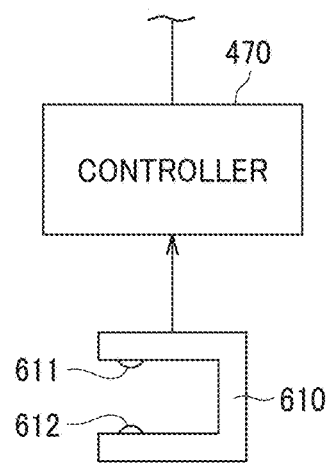
FIG. 4B is an explanatory diagram illustrating coupling between a controller and an optical sensor as a resistance value acquisition unit.

FIG. 4A illustrates a power supply circuit to supply power to the heater. The heat generator 360 of the heater may include the PTC elements 361 to 368 illustrated in FIGS. 3C to 3H. FIG. 4B is an explanatory diagram illustrating coupling between a controller and an optical sensor as a resistance value acquisition unit to be described below. The power supply circuit illustrated below the heater in FIG. 4A supplies power to the heat generator 360 and the PTC elements 361 to 368.

The power supply circuit includes an electric power controller 400 as a power control unit or circuitry, an AC power supply 410, a triac 420, a current detector 430, a heater relay 440, a voltage detector 450, and a controller 470. The AC power supply 410, a current transformer CT in the current detector 430, the triac 420, and the heater relay 440 are coupled in series between the electrodes 360c and 360d. In addition, the voltage detector 450 is coupled between the electrodes 360c and 360d.

Push switches 511 and 512 as the resistance value acquisition unit described later are coupled to the controller 470 to acquire a resistance value of the heat generator 360 of the new fixing device 300 after replacement and input the resistance value to the electric power controller 400 via the controller 470. Service personnel operate the controller 470 to give an instruction to the electric power controller 400 for checking the heater and the like.

The first temperature sensor TH1 and the second temperature sensor TH2 detect a temperature T4 and T8, respectively, and input the temperatures to the electric power controller 400. Based on the temperature T4 detected by the first temperature sensor TH1, the electric power controller 400 controls the triac 420 that determines a duty cycle of a current supplied to the electrodes 360c and 360d so that each of the PTC elements 361 to 368 has a predetermined temperature.

Specifically, the triac 420 performs duty control of the current flowing through the heat generator 360 at the duty cycle corresponding to the temperature difference between the current temperature T4 detected by the first temperature sensor TH1 and a target temperature. The current is zero at a 0% duty cycle and is at its maximum at a 100% duty cycle.

Figure 5B:
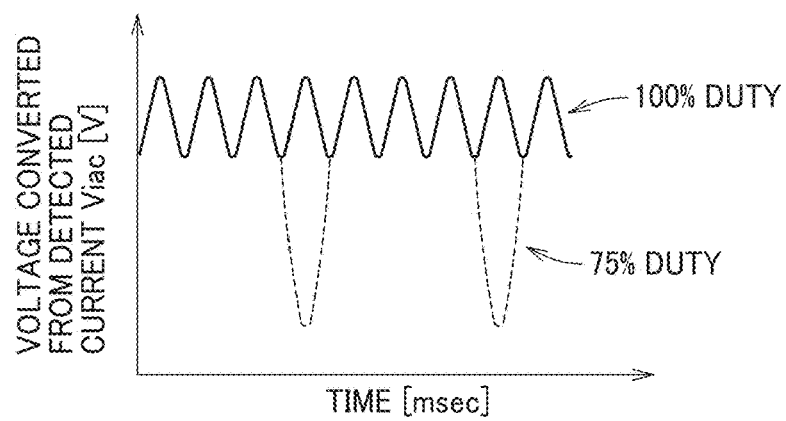
FIG. 5B is a graph illustrating a change in voltage waveform due to duty control.

FIG. 5B illustrates examples of voltages Viac converted from the currents at the 100% duty cycle and a 75% duty cycle. At the 75% duty cycle, the voltage Viac converted from the current largely fluctuates in a cycle.

The electric power controller 400 may be a microcomputer including a central processing unit (CPU), a read-only memory (ROM), a random-access memory (RAM), and an input and output (I/O) interface. The sheet passing through the fixing nip SN takes heat, that is, causes heat transfer to the sheet. Therefore, control of the current supplied to the electrodes based on the heat transfer in addition to the temperature T4 detected by the first temperature sensor TH1 can control the temperature of the fixing belt 310 to a desired temperature.

The current detector 430 detects a total current value flowing through the heat generator 360. That is, the electric power controller 400 reads the total current value flowing between the electrodes 360c and 360d based on a voltage generated in a secondary side resistance of the current transformer CT. The voltage detector 450 detects a voltage value E between the electrodes 360c and 360d of the heat generator 360, and the electric power controller 400 reads the detected voltage value E. The electric power controller 400 calculates a resistance value R (=E/I) of the heat generator 360 from the total current value I and the voltage value E.

When any one of the PTC elements 361 to 368 fails or breaks, the current value read by the electric power controller 400 decreases. In particular, failure or disconnection in the PTC element 364 in which the first temperature sensor TH1 detects the temperature means that the temperature control function of the electric power controller 400 is lost. In this case, regardless of the temperatures of the other PTC elements 361 to 363, 365 to 368, the triac 420 keeps supplying power to the electrodes 360c and 360d with the 100% duty cycle.

Therefore, in the present embodiment, when the current detected by the current detector 430 falls below a predetermined threshold current, the heater relay 440 is turned OFF to interrupt the current flowing between the electrodes 360c and 360d. Specifically, the current detector 430 detects the current flowing through the PTC elements 361 to 368 using the voltage Viac converted from the current by the current transformer CT.

The electric power controller 400 compares the voltage Viac converted from the current with a predetermined threshold voltage Vith stored in advance. When Viac<Vith, that is, when the amount of current to PTC elements 361 to 368 falls below the predetermined threshold current, the electric power controller 400 turns off the heater relay 440 to stop power supply to the PTC elements 361 to 368.

Setting the 0% duty cycle in the triac 420 similarly stops the power supply, but turning off the heater relay 440 reliably cuts off the current. When the temperature T8 detected by the second temperature sensor TH2 exceeds the predetermined high temperature threshold, the heater relay 440 may be turned off to stop the current flowing between the electrodes 360c and 360d.

Fixing Operation

In FIG. 2A, when the sheet P is conveyed in a direction indicated by arrow and passes through the fixing nip SN, the sheet P is heated between the fixing belt 310 and the pressure roller 320 so that the toner image is fixed to the sheet P. In this case, heat from the heat generator 360 heats the fixing belt 310 sliding on the insulation layer 370 of the heat generator 360.

In temperature control of the heat generator 360 using only the first temperature sensor TH1 to set the temperature of the fixing belt 310 to the target temperature, cutting off the power supply by the disconnection in the only PTC element 364 in which the first temperature sensor TH1 detect the temperature causes too much current supply to the other normal PTC elements 361 to 363 and 365 to 368 and results in abnormal high temperature because cutting off the power supply in the only PTC element 364 stop temperature rise in the PTC element 364, but the electric power controller 400 increases the duty cycle to lead the temperature of the PTC element 364 to the target temperature.

Therefore, in the present embodiment, the second temperature sensor TH2 is disposed in the heating region of the PTC element 368 at the end portion. The second temperature sensor TH2 detects the temperature T8 of the PTC element 368. When the temperature T8 becomes the abnormal high temperature described above, the electric power controller 400 controls the triac 420 to cut off the current supplied to the electrodes 360c and 360d. Additionally, when the second temperature sensor TH2 detects the predetermined temperature TN or lower caused by the disconnection in the PTC element 368, that is, T8<TN, the electric power controller 400 controls the triac 420 to cut off the current supplied to the electrodes 360c and 360d.

Other Fixing Devices

Figure 2B:
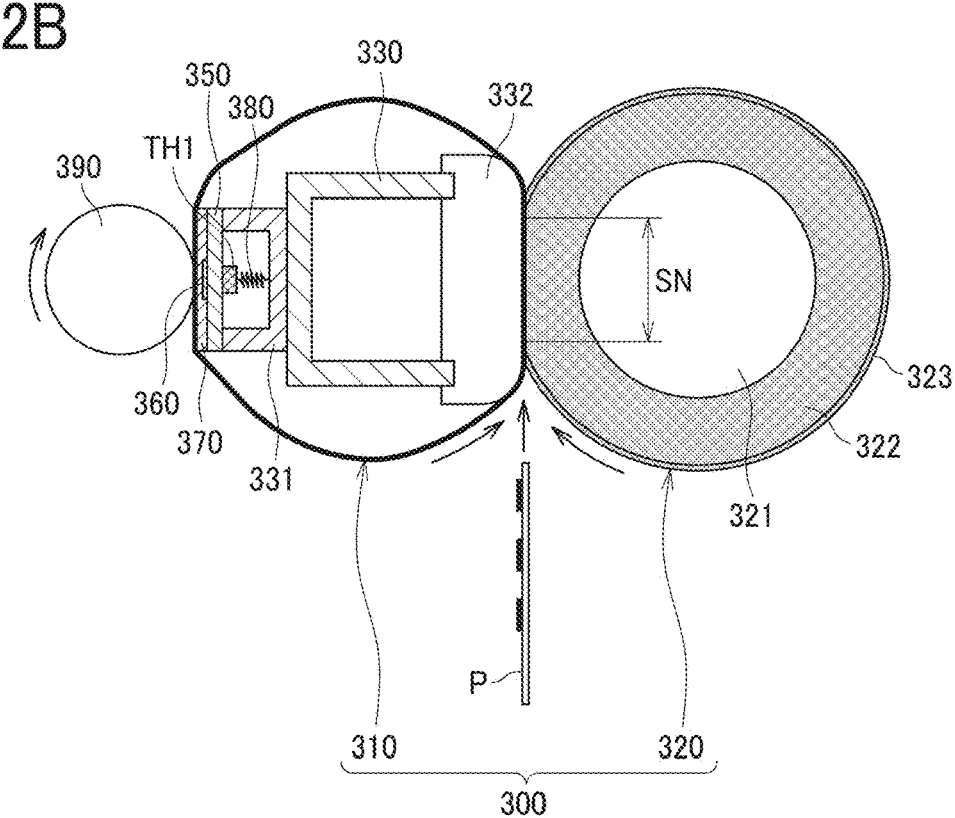
FIG. 2B is a cross-sectional view illustrating a second fixing device according to the embodiment of the present disclosure.
Figure 2C:
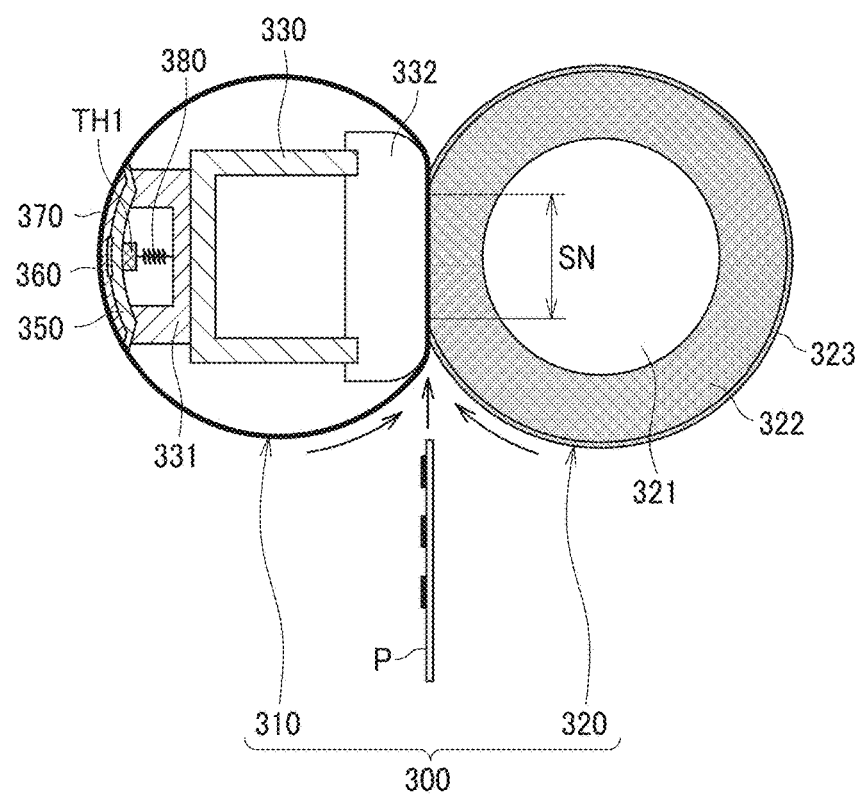
FIG. 2C is a cross-sectional view illustrating a third fixing device according to the embodiment of the present disclosure.
Figure 2D:
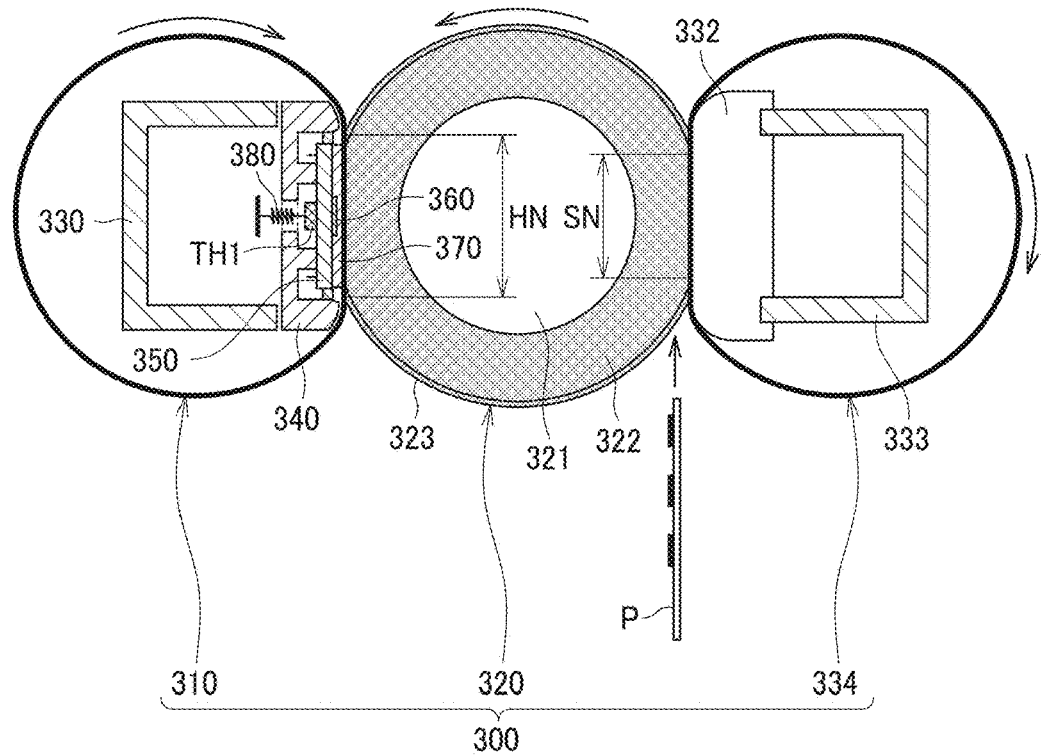
FIG. 2D is a cross-sectional view illustrating a fourth fixing device according to the embodiment of the present disclosure.

The fixing device 300 is not limited to the first fixing device in FIG. 2A. With reference to FIGS. 2B to 2D, the second to fourth fixing devices is described below. As illustrated in FIG. 2B, the second fixing device includes the pressure roller 320 and a pressing roller 390 on the opposite side of the pressure roller 320 and heats the fixing belt 310 nipped between the pressing roller 390 and the heater.

The heater described above is disposed inside the inner circumferential surface of the fixing belt 310. A stay 330 includes an auxiliary stay 331 attached on one side of the stay 330 and a nip formation pad 332 attached on the other side of the stay 330. The auxiliary stay 331 supports the heater. The nip formation pad 332 contacts the pressure roller 320 via the fixing belt 310 to form the fixing nip SN.

As illustrated in FIG. 2C, the third fixing device includes the heater disposed inside the inner circumferential surface of the fixing belt 310. Instead of the pressing roller 390 described above, the heater includes the base 350 and the insulation layer 370 both of which have arc-shaped cross sections meeting the curvature of the fixing belt 310 to lengthen a circumferentially contact length of the fixing belt 310. The heat generator 360 is disposed at the center of the arc-shaped base 350. Other parts of the third fixing device are identical to the second fixing device in FIG. 2B.

As illustrated in FIG. 2D, the fourth fixing device includes a heating nip HN and the fixing nip SN separately. That is, the nip formation pad 332 and the stay 333 configured by a metallic channel member are disposed on one side of a pressure roller 320 opposite to the fixing belt 310, and a pressing belt 334 is arranged circumferentially rotatably, enveloping the nip formation pad 332 and the stay 333. The sheet P passes through the fixing nip SN between the pressing belt 334 and the pressure roller 320 and is subjected to heating and fixing. Other parts of the fourth fixing device are identical to the first fixing device in FIG. 2A.

As indicated by the broken line of FIG. 2A, the second temperature sensor TH2 for safety may be pressed by a biasing member to be disposed downstream from the PTC element 368 on the inner circumferential surface of the fixing belt 310 heated by the PTC element 368 different from the PTC element 366 detected by the first temperature sensor TH1 for temperature control. Increasing the number of resistance heat generators has difficulty in ensuring an arrangement space for a temperature sensor, but the arrangement of the second temperature sensor TH2 described above can alleviate the difficulty of ensuring the arrangement space. In addition to the PTC element 368, the second temperature sensor TH2 may be disposed in each of the heating regions of the other PTC elements 361 to 363 and 365 to 367, including the inner circumferential surface of the fixing belt 310.

Error Detection

Figure 6A:
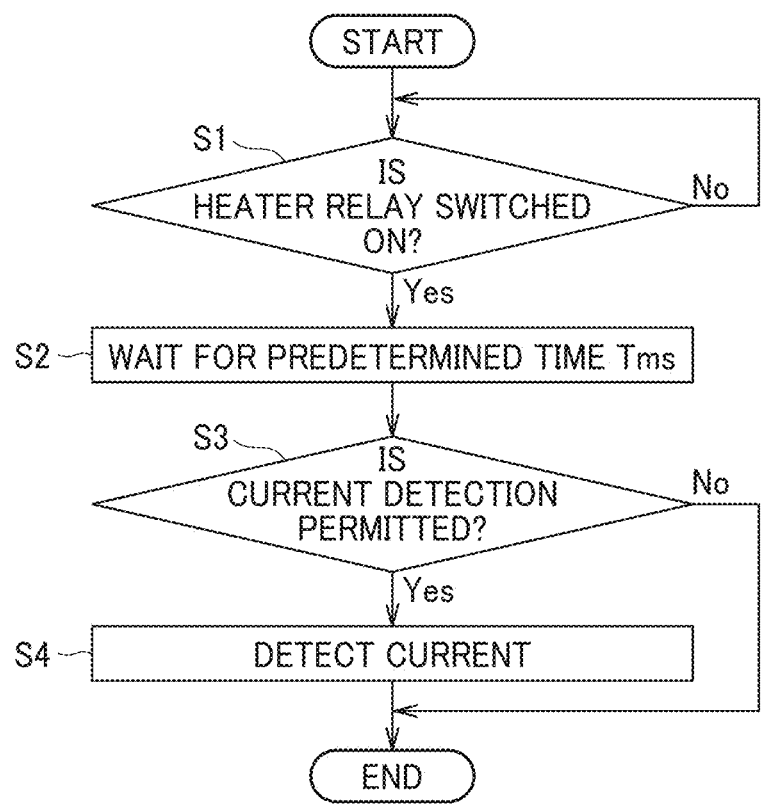
FIG. 6A is a flowchart illustrating basic control processes of the heater performed by a current detector.
Figure 6B:
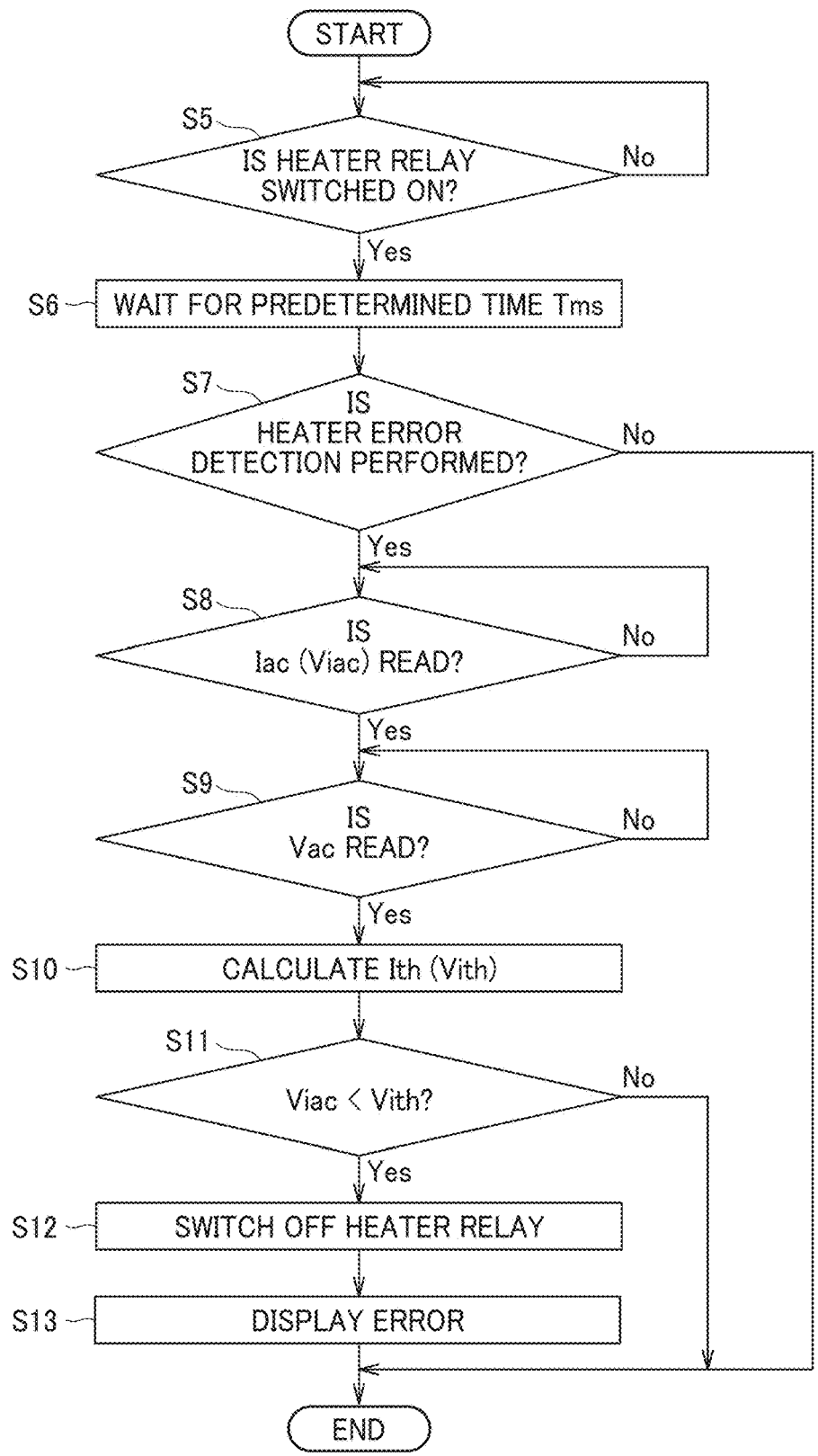
FIG. 6B is a flowchart illustrating detailed control processes of the heater performed by a current detector.

With reference to flowcharts of FIGS. 6A to 6C, a description is given of error detection by the electric power controller 400. FIG. 6A is a flowchart of a basic control operation of the heater. The basic control operations in the flowchart starts when the electric power controller 400 receives a start-up signal of the fixing device 300, that is, substantially the heater. In step S1, the electric power controller 400 checks whether the heater relay 440 is switched on. The electric power controller 400 reads the voltage value Viac that is converted into the voltage by the current transformer CT in the current detector 430. The timing of reading the voltage is immediately after the start of startup of the fixing device 300.

Specifically, the timing immediately after the start of the start-up is preferably timing after a predetermined time T ms has passed since the heater relay 440 is switched on, as in step S2, because the characteristics of the circuit of the current detector 430 requires the predetermined time for which the current transformer CT converts the current value into the voltage value, and the current detector 430 can perform stable current detection.

Therefore, after the predetermined time T ms has passed, the electric power controller 400 permits the current detection (Yes in step S3) and reads the voltage value Viac in step S4, which is converted based on the current value detected by the current detector 430. Preferably, when reading the voltage value Viac, the electric power controller 400 performs aggregation processing in which the current detector 430 detects current values a plurality of times for a predetermined time, and the electric power controller 400 excludes maximum and minimum extreme values among detected current values to reduce the influence of noise picked up in the current detection. When the electric power controller 400 does not permit the current detection (No in step S3), the electric power controller 400 completes the operations in the flowchart.

When the electric power controller 400 samples the current values a plurality of times for the predetermined time in the start-up, the current detection accuracy is most excellent at the 100% duty cycle as seen from FIG. 5B. For example, at the 75% duty cycle, the current value decreases at a constant interval. This prevents the current detection period from extending, thereby causing the impact of noise. Detection at the 100% duty cycle in the start-up can detect an abnormality before printing and avoid an occurrence of the fixing failure, that is, a print failure, in advance.

Figure 5C:
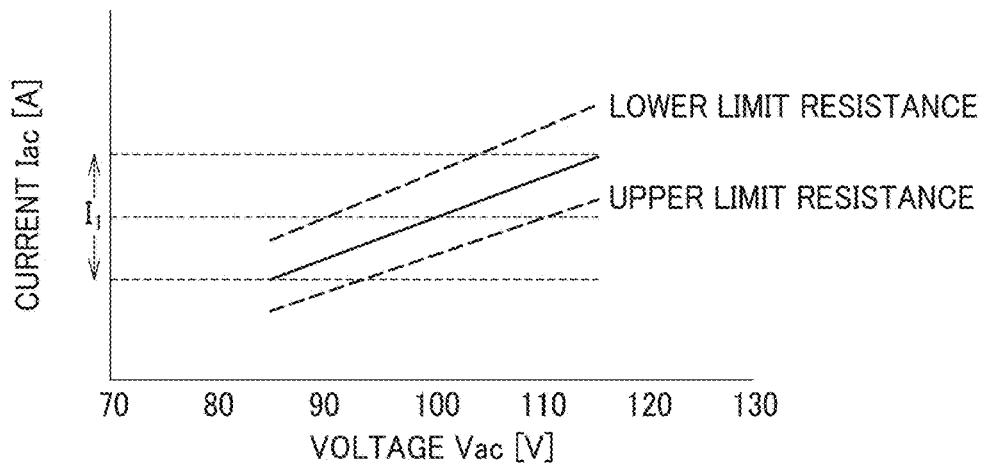
FIG. 5C is a graph illustrating current-voltage correlations in the resistance heat generator.

However, when a constant duty cycle is held long enough during the current detection at the duty cycle less than 100%, the decrease of the current value described above in the duty control is predictable in advance. Therefore, the current detection is possible after the start-up and after temperatures of the PTC elements 361 to 368 rise to some extent. The solid line in FIG. 5C illustrates a target current-voltage correlation in the PTC elements 361 to 368. The broken lines above and below the solid line are the current-voltage correlations at the lower resistance limit and the upper resistance limit.

As described above, since the temperature stabilizes when the temperature of the PTC elements 361 to 368 rises to a certain extent, the current-voltage correlation is linearly stabilized as illustrated in FIG. 5C. Therefore, the current Iac flowing through the PTC elements 361 to 368 can be easily detected in a stable state. In this case, it is also preferable to detect the current value Iac flowing through the PTC elements 361 to 368 before the sheet passes through the fixing device and determine whether the abnormality occurs.

FIG. 6B specifically illustrates current detection in step S4 of FIG. 6A as steps from S8 to S11 with steps S1 and S2 corresponding to steps S5 and S6, respectively. The process ends when the electric power controller 400 determines not performing the error detection in step S7.

When the electric power controller 400 determines preforming the error detection (Yes in step S7), the current detector 430 converts the current Iac flowing between the electrodes 360c and 360d that are connected to the PTC elements 361 to 368 into the voltage Viac and detects the voltage value Viac, and the electric power controller 400 reads the voltage value Viac in step S8. In step S9, the voltage detector 450 detects the voltage Vac between the electrodes 360c and 360d, and the electric power controller 400 reads the voltage value Vac.

Thereafter, in step S10, the electric power controller 400 calculates at least one of an error threshold current Ith and an error threshold voltage Vith and, in step S11, compares the converted voltage value Viac with the error threshold voltage Vith. The process ends when the converted voltage value Viac is the error threshold voltage value Vith or more, that is, Viac≥Vith.

On the other hand, when the converted voltage value Viac that is detected is smaller than the error threshold voltage value Vith, that is, Viac<Vith, the electric power controller 400 determines that failure, that is, the disconnection occurs in any one of the PTC elements 361 to 368 and turns off the heater relay 440 in step S12. At the same time, in step S13, an operation panel of the image forming apparatus 100 displays the occurrence of the error to notify the user the occurrence of the error.

Turning off the power during printing and stopping rotations of the sheet feed roller 60 and other rollers at the same time results in a sheet jam, and not stopping rotations of the sheet feed roller 60 and other rollers results in an increase of the fixing failure. Therefore, preferably, the image forming apparatus 100 continues the printing and only notifies the error except when an influence of a partial disconnection in the PTC elements 361 to 368 is particularly large, for example, when the influence endangers safety, or fax signals are received and printed.

Since the voltage Vac applied between the electrodes 360c and 360d largely affects the current Iac flowing between the electrodes 360c and 360d as illustrated in FIG. 5B, the voltage detector 450 independently detects the voltage Vac between the electrodes 360c and 360d. Therefore, depending on the magnitude of the detected voltage value Vac, the error threshold current Ith or the error threshold voltage Vith needs to be corrected.

As indicated by the broken lines corresponding to the lower resistance limit and the upper resistance limit in FIG. 5C, the total resistance value of the PTC elements 361 to 368 between the electrodes 360c and 360d varies in a range of about ±5% to ±10% due to manufacturing variations of the PTC elements 361 to 368. To absorb the variation described above, the voltage value Vac may need to correct the error threshold current Ith or the error threshold voltage Vith.

In the present embodiment, an allowable variation threshold of the voltage value Vac in which the error threshold current Ith or the error threshold voltage Vith is not corrected may be set, for example, in the range of ±5%. When the variation of the voltage value Vac exceeds ±5%, the error threshold current Ith or the error threshold voltage Vith may be corrected. Specifically, when the converted voltage value Viac is compared with the error threshold voltage value Vith in step S11, the error threshold voltage value Vith is corrected by increasing or decreasing corresponding to the variation rate (%) of the voltage value Vac.

FIG. 6C is a flowchart illustrating the above-described control processes of the heater performed by the first temperature sensor TH1 and the second temperature sensor TH2. In step S21 of FIG. 6C, the image forming apparatus 100 is instructed to perform a printing job.

In step S22, the electric power controller 400 starts power supply from the AC power supply 410 to the PTC elements 361 to 368 in the heat generator 360. In step S23, the first temperature sensor TH1 detects the temperature T4 of the PTC element 364 located in the central region of the heat generator 360.

Next, in step S24, the triac 420 starts the temperature control of the heat generator 360. In step S25, the second temperature sensor TH2 detects the temperature T8 of the PTC element 368.

In step S26, the electric power controller 400 determines whether the temperature T8 is equal to or higher than a predetermined temperature TN, that is, T8≥TN. When the temperature T8 is lower than the predetermined temperature, that is, T8<TN, the electric power controller 400 determines that abnormal low temperature, that is, disconnection occurs and controls the triac 420 to substantially cut off the power supply to the heat generator 360 in step S27. In step S28, the operation panel of the image forming apparatus 100 displays the error. When the temperature T8 detected by the second temperature sensor TH2 becomes abnormally high, the electric power controller 400 may similarly control the triac 420 so that the power supply to the heat generator 360 is cut off.

When the temperature T8 is equal to or higher than the predetermined temperature TN, that is, T8≥TN, the electric power controller 400 determines that abnormal low temperature does not occur, and the print job is started in step S29. The safety of the heater and the fixing device 300 is improved when the electric power controller 400 works according to the flow chart in FIG. 6C using the second temperature sensor TH2 in addition to the flow charts in FIGS. 6A and 6B using the current detector 430 as described above.

Identification Block and Push Switch

Next, an identification block 500 as a resistance value identifier and the push switches 511 and 512 as the resistance value acquisition unit is described with reference to FIG. 7. Replacement of the fixing device 300 due to the end of its service life or a failure or other error changes the resistance value of the heat generator 360 from that before replacement even when the resistance value is within a tolerance range. Therefore, without adjusting the duty cycle, the heater may not suitably output after the replacement. A method to optimize the heater output, in which a relation between the detected temperature and time in the heat generator 360 is evaluated during a new device detection operation, and the lighting duty of the heater is controlled based on the relation, has an issue that it is difficult to acquire the relation stably.

In the embodiment of the present disclosure, the resistance value of the heat generator 360 in the new replaced fixing device 300 is acquired by using the push switches 511 and 512 and the identification block 500 illustrated in FIG. 7. The acquired resistance value is input to the electric power controller 400 via the controller 470. When the resistance value is different from that before the fixing device 300 is replaced, the electric power controller 400 changes and adjusts the lighting duty of the heat generator 360 during the print job based on the resistance value and the detection result of the voltage detector 450.

The identification blocks 500 are four types illustrated in FIGS. 7A to 7D and are each fixed on the outer surface of the case of the fixing device 300. The identification block 500 illustrated in FIG. 7A has a flat low surface 501. The identification block 500 illustrated in FIG. 7B has a high protrusion 502 at its right end. The identification block 500 illustrated in FIG. 7C has a high protrusion 503 at its left end. The identification block 500 illustrated in FIG. 7D has a flat high surface 504.

Corresponding to the resistance value of the heat generator 360 in the fixing device 300 measured before shipment from a factory, any one of the four types of the identification blocks 500 illustrated in FIGS. 7A to 7D is attached to the outer surface of the case of the fixing device 300 during a production process and a shipment process of the fixing device 300. The identification block 500 illustrated in FIG. 7A is attached to the fixing device 300 including the heat generator having the largest resistance value within the tolerance range. The identification block 500 illustrated in FIG. 7B is attached to the fixing device 300 including the heat generator having medium to large resistance values within the tolerance range.

The identification block 500 illustrated in FIG. 7C is attached to the fixing device 300 including the heat generator having small to medium resistance values within the tolerance range. The identification block 500 illustrated in FIG. 7D is attached to the fixing device 300 including the heat generator having the smallest resistance value within the tolerance range. These relationships are summarized in Table 1 below.

TABLE 1

| Push switch | | 511 | 512 | Protrusion pattern of the identification block |
|---|---|---|---|---|
| FIG. 7A | Resistance value: large | OFF | OFF | |
| FIG. 7B | Resistance value: Medium to large | OFF | ON | |
| FIG. 7C | Resistance value: Small to medium | ON | OFF | |
| FIG. 7D | Resistance value: small | ON | ON | |

The push switches 511 and 512 are disposed side by side on one side of a base 510. The push switches 511 and 512 and the base 510 are disposed on the body of the image forming apparatus 100 as illustrated in FIG. 1C. When the fixing device 300 having the identification block 500 is installed into the body of the image forming apparatus 100, the identification block 500 is disposed to face the push switches 511 and 512 as illustrated in FIGS. 7A to 7D.

Based on results of the identification block 500 turning the push switches 511 and 512 on and off, the electric power controller 400 selects one of four types of resistance values and adjusts the lighting duty of the heat generator 360 during use based on the selected resistance value and the detection result of the voltage detector 450. Acquiring, determining, and setting the resistance value based on the shape of the identification block 500 as described above can provide highly reliable resistance value setting at low cost.

Detection Process of the Identification Block

FIG. 8 is a flowchart including a detection process of the identification block 500 performed in the body of the image forming apparatus 100 when the user replaces the fixing device 300 with a new one. Executing the detection process of the identification block 500 enables the electric power controller 400 to appropriately control the power of the heat generator 360 as intended, regardless of the variation in the temperature resistance characteristics of the new heat generator 360.

In step S31 of FIG. 8, the electric power controller 400 determines whether the fixing device 300 is replaced with a new device. When the fixing device 300 is replaced with a new device, the identification block 500 is detected in step S32. In step S33, the electric power controller 400 sets the resistance value R of the heat generator based on the detection result of the identification block 500. Then, in step S34, the resistance value R related to temperature data of the heat generator 360 is stored in the non-volatile memory of the electric power controller 400 in the body of the image forming apparatus 100, and, at the same timing, the supply of the lighting duty to the heat generator is started based on the temperature characteristic of the resistance value R in step S35.

After the print job completes, when another print job starts, the electric power controller 400 reads the resistance value R stored in the non-volatile memory from the previous detection result of the identification block 500 as long as the fixing device 300 is not replaced and adjusts the lighting duty of the heat generator 360 during the print job based on the resistance value R and the detection result of the voltage detector 450.

As described above, the lighting duty is supplied to the heat generator 360 after the electric power controller 400 adjusts the lighting duty to get a desired power, that is, a desired heat generation amount, based on the resistance value R obtained by the detection of the identification block 500 of the heat generator 360. Therefore, the power of the heat generator 360 can be suitably controlled as intended, regardless of the variation in the resistance value of the heat generator 360, that is, the variation in the temperature-resistance characteristics of the heat generator 360.

Another Embodiment of the Resistance Value Identifier

The resistance value identifier is not limited to the identification block 500. FIGS. 9A and 9B illustrate an identification feeler 600 as the identifier instead of the identification block 500 and an optical sensor 610 on the body of the image forming apparatus 100. Instead of the push switches 511 and 512, the optical sensor 610 is coupled to the controller 470 as illustrated in FIG. 4B.

The identification feeler 600 is disposed on the outer surface of the case of the fixing device 300 and has a wind turbine shape in which a small feeler 602, a medium feeler 603, and a large feeler 604 are disposed in this order around a central shaft 601. During the production process and the shipment process of the fixing device 300, any one of the feelers is positioned right side of the central shaft 601 as illustrated in FIG. 9A by rotating the feeler 600 around the central shaft 601 at an angle corresponding to the resistance value of the heat generator 360 in the fixing device 300 measured before the shipment from the factory.

On the other hand, the optical sensor 610 includes a plurality of light-emitting elements 611 and a plurality of light-receiving elements 612, which are arranged in an arc shape and disposed to face each other in the vertical direction. When the fixing device 300 having the identification feeler 600 is installed in the body of the image forming apparatus 100 as illustrated in FIG. 1C, in the optical sensor 610 in FIGS. 9A and 9B disposed on the body, any one of the small feeler 602, the medium feeler 603, and the large feeler 604 of the identification feeler 600 shields light beam group emitted from the plurality of light-emitting elements 611 and received by the plurality of light-receiving elements 612.

The large feeler 604 shields all light beam group, but the small feeler 602 and the medium feeler 603 partially shields the light beam group. Therefore, according to a number of the light-receiving elements 612 that are shielded from the light beam group, the resistance value of the heat generator 360 of the fixing device 300 can be detected, acquired, and set. The resistance value is input to the electric power controller 400 via the controller 470 in FIG. 4B. The electric power controller 400 adjusts the lighting duty of the heat generator 360 during the print job based on the resistance value and the detection result of the voltage detector 450.

Acquiring, determining, and setting the resistance value based on the shape of the identification feeler 600 as described above can provide highly reliable resistance value setting at low cost. Additionally, the cost of the identification feeler 600 is lower than that of the identification block 500 because one type of identification feeler 600 rotates around the central shaft 601 to move one of the plurality of types of feelers to a predetermined position, that is, a plurality of parts is not needed.

The present disclosure is not limited to the embodiments described above, and various modifications and improvements are possible. For example, although the identification block 500 or the identification feeler 600 is used as the resistance value identifier to record the resistance value of the resistance heat generator in the above embodiment, alternatively, a bar code or other two-dimensional code may be used as the resistance value identifier. In this case, the body of the image forming apparatus includes a bar code reader or a two-dimensional code reader as the resistance value acquisition unit corresponding to them.

The heater according to the present disclosure may be used for a drying device other than the fixing device as the heating device of the present disclosure. That is, the present disclosure may be applied to the image forming apparatus using the ink jet method and having a drying device as the heating device. The heating device of the present disclosure includes not only the fixing device but also the drying device or the like. In addition to the PTC element, other resistance heat generators such as a ceramic heater may be used. A mode for the overlap between resistance heat generators may be interdigitation of recess-and-protrusion or shapes like combs other than the modes illustrated in FIGS. 3D, 3E, 3G, and 3H. The number of PTC elements may be fewer or more than eight. Furthermore, the PTC elements may be disposed in a plurality of lines in the short side direction of the base 350.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus comprising:
   a body
   a heating device installed in the body, the heating device including a heat generator, the heating device configured to provide information indicating a resistance value of the heat generator;
   a resistance value acquisition device on the body, the resistance value acquisition device configured to acquire the resistance value of the heat generator from the heating device;
   a detector configured to detect detachment and attachment of the heating device from and to the body; and
   an electric power controller in the body, the electric power controller configured to control the heat generator by,
      causing the resistance value acquisition device to acquire the resistance value of the heat generator when the detector detects the detachment and attachment of the heating device, and
      changing a lighting duty of the heat generator when the resistance value acquired from the heat generator is different from the resistance value prior to detection of the detachment and attachment of the heating device.

2. The image forming apparatus according to claim 1, further comprising:
   a resistance value identifier on a surface of a case of the heating device such that the resistance value identifier has a shape corresponding to the resistance value of the heat generator.

3. The image forming apparatus according to claim 2, wherein:
   the resistance value acquisition device is a push switch configured to detect the shape of the resistance value identifier to acquire the resistance value of the heat generator.

4. The image forming apparatus according to claim 2, wherein:
   the resistance value acquisition device is an optical sensor configured to detect the shape of the resistance value identifier to acquire the resistance value of the heat generator.

5. The image forming apparatus according to claim 1, further comprising:
   a non-volatile memory in the body, the non-volatile memory configured to store the resistance value of the heat generator acquired by the resistance value acquisition device, wherein
   the electric power controller is configured to adjust the lighting duty of the heat generator based on the resistance value stored in the non-volatile memory when the detector does not detect the detachment and the attachment of the heating device.

6. The image forming apparatus according to claim 1, wherein the heat generator includes a plurality of resistance heat generators electrically connected in parallel.

7. The image forming apparatus according to claim 1, wherein the heat generator includes a plurality of positive temperature coefficient (PTC) elements electrically connected in parallel.

8. The image forming apparatus according to claim 1, further comprising:
   an exterior member configured to open and close to attach and detach the heating device to and from the body; and
   wherein the detector is configured to detect opening and closing of the exterior member.

* * * * *